United States Patent
Deshpande

(10) Patent No.: US 10,011,714 B2
(45) Date of Patent: Jul. 3, 2018

(54) MONOLAYER CARBON DIOXIDE BARRIER PET BOTTLES

(75) Inventor: Girish N. Deshpande, Bolingbrook, IL (US)

(73) Assignee: Plastipak Packaging, Inc., Plymouth, MI (US)

(*) Notice: Subject to any disclaimer, the term of this patent is extended or adjusted under 35 U.S.C. 154(b) by 277 days.

(21) Appl. No.: 13/612,064

(22) Filed: Sep. 12, 2012

(65) Prior Publication Data

US 2013/0231422 A1 Sep. 5, 2013

Related U.S. Application Data

(60) Provisional application No. 61/533,449, filed on Sep. 12, 2011.

(51) Int. Cl.
| | |
|---|---|
| C08K 5/00 | (2006.01) |
| C08L 67/02 | (2006.01) |
| C08K 5/1545 | (2006.01) |
| C08K 5/3437 | (2006.01) |

(52) U.S. Cl.
CPC ............ *C08L 67/02* (2013.01); *C08K 5/1545* (2013.01); *C08K 5/3437* (2013.01)

(58) Field of Classification Search
CPC ...... C08L 67/02; C08K 5/1545; C08K 5/3437
USPC .......................................................... 524/89
See application file for complete search history.

(56) References Cited

U.S. PATENT DOCUMENTS

| | | | | |
|---|---|---|---|---|
| 3,009,760 A | * | 11/1961 | Lenz ......................... | D06P 3/79 8/513 |
| 3,080,278 A | * | 3/1963 | Raymond .............. | A01N 27/00 106/16 |
| 3,535,243 A | * | 10/1970 | Chao ........................ | C10M 3/00 252/401 |
| 3,793,401 A | * | 2/1974 | Nield et al. ........... | C08F 279/02 524/109 |
| 4,389,321 A | * | 6/1983 | Malherbe ............. | C07D 239/70 252/400.22 |
| 4,798,883 A | * | 1/1989 | Tung .................... | C08G 63/672 525/437 |
| 5,198,134 A | * | 3/1993 | Steinberg ............. | C07C 211/58 508/556 |
| 5,663,290 A | * | 9/1997 | Heise .................... | C08G 63/88 528/298 |

(Continued)

FOREIGN PATENT DOCUMENTS

| | | |
|---|---|---|
| AU | 2012308752 A1 | 4/2014 |
| JP | 2004-536201 | 12/2004 |

(Continued)

OTHER PUBLICATIONS

U.S. Appl. No. 61/533,449, filed Sep. 12, 2011, Deshpande.

(Continued)

*Primary Examiner* — Robert S Loewe
(74) *Attorney, Agent, or Firm* — Ballard Spahr LLP

(57) ABSTRACT

Disclosed herein are articles comprising polymer compositions that can provide a barrier to carbon dioxide diffusion. The disclosed polymer compositions can be utilized in packaging to retard or prevent the diffusion of carbon dioxide out of a carbonated liquid, inter alia, a carbonated soft drink. This abstract is intended as a scanning tool for purposes of searching in the particular art and is not intended to be limiting of the present invention.

18 Claims, 5 Drawing Sheets

(56) References Cited

U.S. PATENT DOCUMENTS

| | | | |
|---|---|---|---|
| 6,489,386 B1* | 12/2002 | Plotzker | B65D 65/38 524/222 |
| 6,863,988 B2 | 3/2005 | Tibbitt et al. | |
| 2005/0221036 A1* | 10/2005 | Shi | C08K 5/053 428/35.7 |
| 2006/0180790 A1 | 8/2006 | Deshpande et al. | |
| 2006/0275568 A1* | 12/2006 | Shi | C08G 63/82 428/35.7 |
| 2007/0117887 A1* | 5/2007 | Naik et al. | 524/89 |
| 2007/0128389 A1 | 6/2007 | Kezios et al. | |
| 2007/0222108 A1 | 9/2007 | Warkoski et al. | |
| 2008/0169590 A1 | 7/2008 | Mehta et al. | |
| 2008/0173215 A1 | 7/2008 | Sakurazawa et al. | |
| 2009/0068380 A1 | 3/2009 | Zheng et al. | |
| 2010/0143547 A1 | 6/2010 | Kriegel et al. | |
| 2010/0152079 A1* | 6/2010 | Cherpeck | C10M 133/12 508/362 |
| 2011/0008635 A1* | 1/2011 | Kliesch et al. | 428/480 |
| 2011/0123741 A1 | 5/2011 | Deshpande | |
| 2012/0199515 A1* | 8/2012 | Peters | B29C 47/0004 206/524.6 |

FOREIGN PATENT DOCUMENTS

| | | |
|---|---|---|
| JP | 2008537006 A | 9/2008 |
| JP | 2009-507116 | 2/2009 |
| RU | 2008115799 A | 11/2009 |
| RU | 2394681 C2 | 7/2010 |
| RU | 2579595 C2 | 4/2016 |
| WO | WO-03/010230 | 2/2003 |
| WO | WO-2006112840 A1 | 10/2006 |
| WO | WO-2006/132671 | 12/2006 |
| WO | WO-2007/028731 | 3/2007 |
| WO | WO-2007/040960 | 4/2007 |
| WO | WO-2011/067197 | 6/2011 |
| WO | WO-2011/084691 | 7/2011 |

OTHER PUBLICATIONS

Wilshire Technologies product specifications [online]. Retrieved on [Nov. 2, 2012]. Retrieved from the internet: <URL: http://www.wilshiretechnologies.com/master_pdf/2,6-Dihydroxynaphthalene,% 20CAS%20581-43-1.pdf> entire document (1 page).

Patent Examination Report dated Sep. 10, 2014 by IP Australia for Application No. 2012308752 (Applicant—Plastipak Packaging//) (3 pages).

First Office Action dated Dec. 24, 2014 by the State IP Office of China for Application No. 2012800510200 (Applicant—Plastipak Packaging//) (7 pages).

Written Opinion and International Search Report dated Nov. 23, 2012 for Application No. PCT/US2012/054840, which was filed Sep. 12, 2012 and published as WO/2013/040020 on Mar. 21, 2013 (Applicant—Plastipak Packaging//1st Named Inventor—Deshpande) (9 pages).

International Preliminary Report on Patentability dated Mar. 12, 2014 for Application No. PCT/US2012/054840, which was filed Sep. 12, 2012 and published as WO/2013/040020 on Mar. 21, 2013 (Applicant—Plastipak Packaging//1st Named Inventor—Deshpande) (8 pages).

Extended European Search Report dated Apr. 15, 2015 for application EP 12831859.9, filed Sep. 12, 2012 and published on Jul. 9, 2014 as EP 2750890 (Applicant—Plastipak Packaging, Inc. // Inventor—Girish N. Deshpande) (6 pages).

Office Action issued by the Korean Intellectual Property Office dated Aug. 19, 2015 for application 10-2014-7009606, filed on Sep. 12, 2012, (Applicant—Plastipak Packaging, Inc. // Inventor—Deshpande) (Translation 7 pages).

Notice of Acceptance dated Sep. 10, 2015 by IP Australia for Application No. 2012308752 (Inventor—Deshpande et al.; Applicant—Plastipak Packaging, Inc.;) (2 pages).

Certificate of Grant dated Jan. 7, 2016 by IP Australia for Application No. 2012308752 (Inventor—Deshpande et al.; Applicant—Plastipak Packaging, Inc.;) (1 page).

Office Action issued by the Canadian Patent Office dated Apr. 2, 2015 for application 2870388, filed on Sep. 12, 2012 (Inventor—Deshpande et al.; Applicant—Plastipak Packaging, Inc.;) (3 pages).

Response to Office Action issued by the Canadian Patent Office dated Apr. 2, 2015 for application 2870388, filed on Sep. 12, 2012 (Inventor—Deshpande et al.; Applicant—Plastipak Packaging, Inc.;) (33 pages).

Notice of Allowance issued by the Canadian Patent Office dated Apr. 5, 2016 for application 2870388, filed on Sep. 12, 2012 (Inventor—Deshpande et al.; Applicant—Plastipak Packaging, Inc.;) (1 page).

Second Office Action dated Nov. 6, 2015 by the State IP Office of China for Application No. 2012800510200 (Inventor—Deshpande et al.; Applicant—Plastipak Packaging, Inc.;) (Original—3 pages //Translation—4 pages).

Third Office Action and Search Report were dated Jun. 29, 2016 by the SIPO for CN Application No. 2012800510200, which was filed on Sep. 12, 2012 and published as CN103917369 on Jul. 9, 2014 (Inventor—Deshpande et al.; Applicant—Plastipak Packaging, Inc.;) (Original—6 pages// Translated—7 pages).

Fourth Office Action was dated Mar. 1, 2017 by the SIPO for CN Application No. 2012800510200, which was filed on Sep. 12, 2012 and published as CN103917369 on Jul. 9, 2014 (Inventor—Deshpande et al.; Applicant—Plastipak Packaging, Inc.;) ( Original—5 pages// Translated—7 pages).

Fifth Office Action was dated Aug. 31, 2017 by the SIPO for CN Application No. 2012800510200, which was filed on Sep. 12, 2012 and published as CN103917369 on Jul. 9, 2014 (Inventor—Deshpande et al.; Applicant—Plastipak Packaging, Inc.;) ( Original—7 pages// Translated—11 pages).

Intention to Grant dated Dec. 14, 2017 by the European Patent Office for Patent Application No. 12831859.9, which was filed on Sep. 12, 2012 and published as EP 2750890 on Jul. 9, 2014(Inventor—Deshpande et al.; Applicant—Plastipak Packaging, Inc.;) (6 pages).

Office Action dated Jun. 25, 2017 by the Israeli Patent Office for IL Patent Application No. 231457, which was filed on Sep. 12, 2012 (Inventor—Deshpande et al.; Applicant—Plastipak Packaging, Inc.;) (Original—2 pages // Translation—3 pages).

Notification of Reasons for Refusal was dated Aug. 15, 2016 by the Japanese Patent Office for JP Application No. 2014-529980, which was filed on Sep. 12, 2012 and published as JP 2014528010 on Oct. 23, 2014 (Inventor—Deshpande et al.; Applicant—Plastipak Packaging, Inc.;) ( Original—3 pages// Translated—3 pages).

Notification of Reasons for Refusal was dated Jun. 12, 2017 by the Japanese Patent Office for JP Application No. 2014-529980, which was filed on Sep. 12, 2012 and published as JP 2014-528010-A on Oct. 23, 2014 (Inventor—Deshpande et al.; Applicant—Plastipak Packaging, Inc.;) (Original—4 pages// Translated—4 pages).

Decision of Rejection issued by the Korean Intellectual Property Office dated Apr. 29, 2016 for application 10-2014-7009606, fled on Sep. 12, 2012, (Inventor—Deshpande et al.; Applicant—Plastipak Packaging, Inc.;) (Original—3 pages // Translation—4 pages).

First Examination Report dated Dec. 8, 2014 for application NZ 623391, filed on Sep. 12, 2012 (Inventor—Deshpande et al.; Applicant—Plastipak Packaging, Inc.;) (2 pages).

Response to First Examination Report filed on Apr. 8, 2016 for application NZ 623391, filed on Sep. 12, 2012 (Applicant—Plastipak Packaging, Inc.) (6 pages).

Further Examination Report dated Apr. 29, 2016 for application NZ 623391, filed on Sep. 12, 2012 (Inventor—Deshpande et al.; Applicant—Plastipak Packaging, Inc.;) (1 pages).

Response to Further Examination Report filed on Jun. 7, 2016 for application NZ 623391, filed on Sep. 12, 2012 (Inventor—Deshpande et al.; Applicant—Plastipak Packaging, Inc.;) (2 pages).

First Examination Report dated Jun. 28, 2015 for application NZ 720880, which was filed on Sep. 12, 2012 (Inventor—Deshpande et al.; Applicant—Plastipak Packaging, Inc.;) (2 pages).

(56) References Cited

OTHER PUBLICATIONS

First Examination Report dated Jan. 25, 2018 for application NZ 738621, which was filed on Dec. 21, 2017 (Inventor—Deshpande et al.; Applicant—Plastipak Packaging, Inc.;) (2 pages).
Official Action dated Jun. 19, 2015 by the Patent Office of the Russian Federation for application RU 2014114448, filed on Sep. 12, 2012 (Inventor—Deshpande et al.; Applicant—Plastipak Packaging, Inc.;) (Original—4 pages // Translation—2 pages).
Decision to Grant dated Jan. 12, 2016 by the Patent Office of the Russian Federation for application RU 2014114448, filed on Sep. 12, 2012 (Inventor—Deshpande et al.; Applicant—Plastipak Packaging, Inc.;) (Original—47 pages // Translation—14 pages).

\* cited by examiner

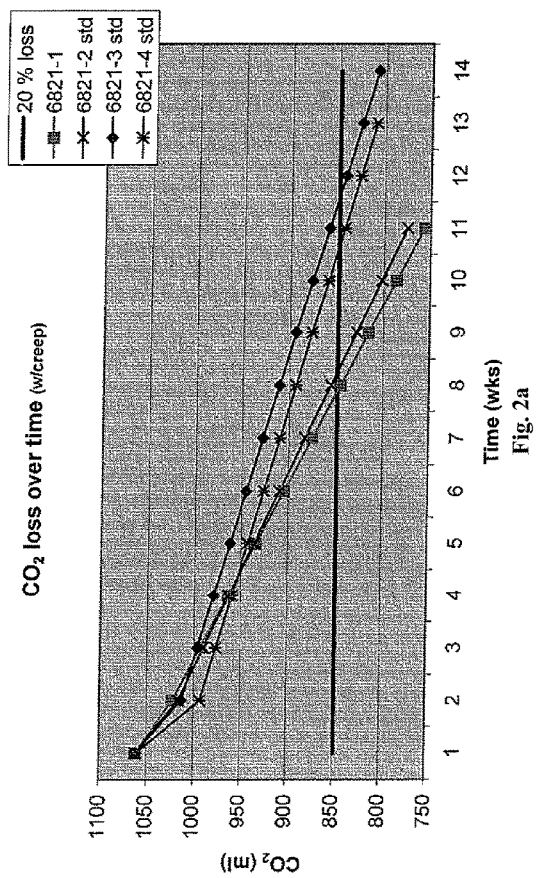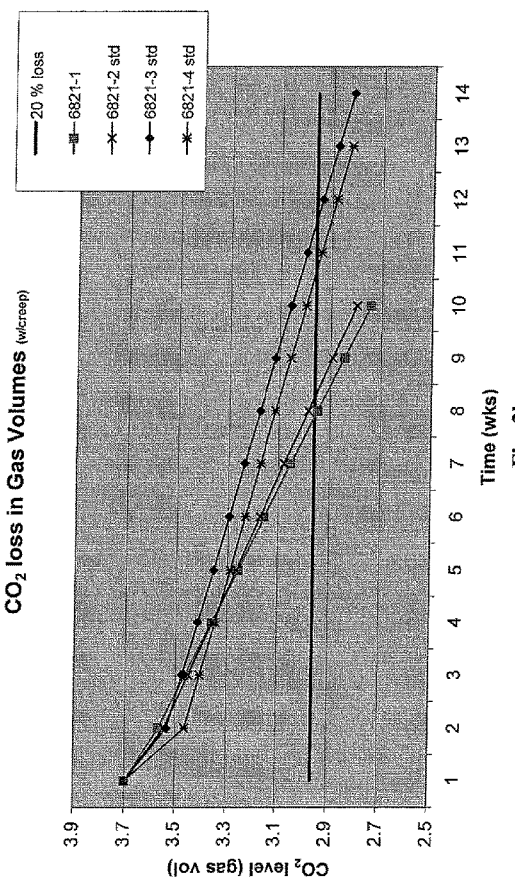

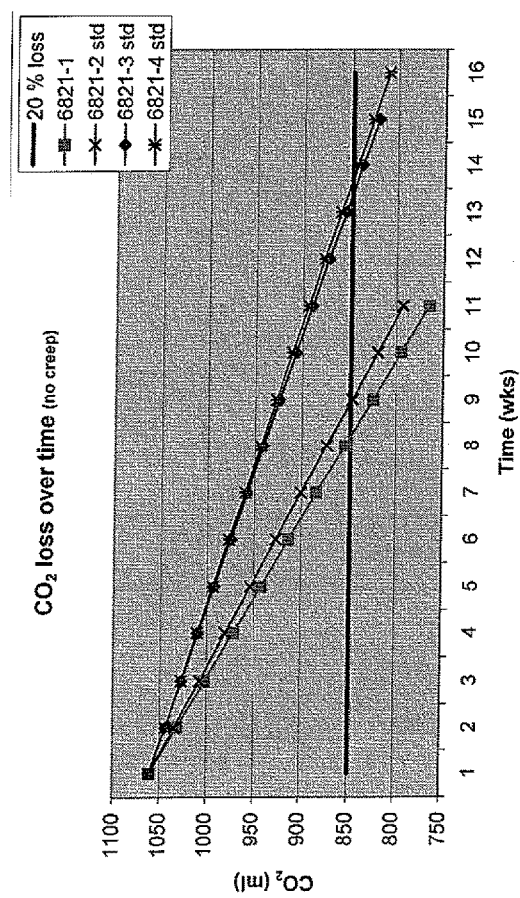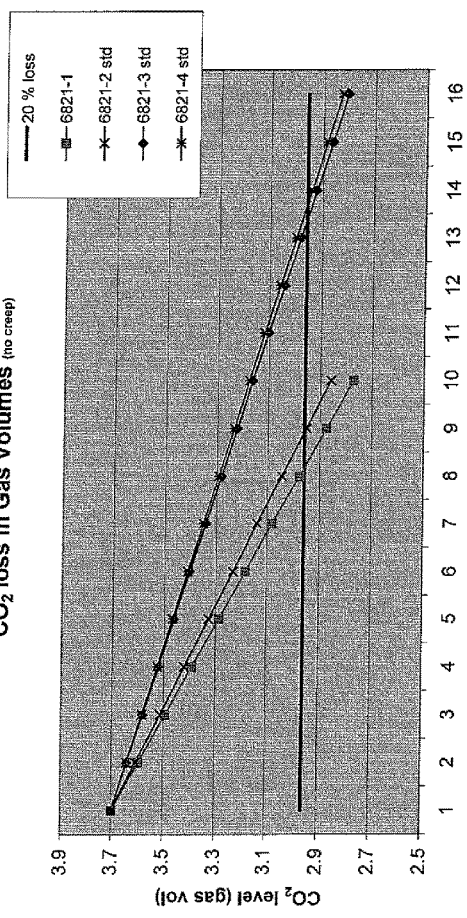

MONOLAYER CARBON DIOXIDE BARRIER PET BOTTLES

CROSS REFERENCE TO RELATED APPLICATIONS

This application claims the benefit of priority to U.S. Provisional Application No. 61/533,449, filed Sep. 12, 2011, which is hereby incorporated by reference in its entirety.

BACKGROUND

Carbon dioxide comprising beverages (carbonated beverages), inter alia, soda pop, beer, and the like, provide an organoleptic property that results in a "refreshing mouth-feel" when consumed. Carbonated beverages, especially carbonated soft drinks, must retain their carbonation in order to not be perceived as "flat." Carbonated beverages that are packed in polyethylene terephthalate (PET) comprising containers can lose their amount of carbonation due to diffusion of carbon dioxide through the PET container.

Current solutions to solving the problem of $CO_2$ diffusion include providing a thicker container, however, this solution leads to an increased cost in the manufacturing of the container. Another solution is to provide a non-permeable barrier, for example, a resin. The added cost of the resin, as the modification of the equipment and processes for manufacturing PET contains makes this solution cost prohibitive. The addition of certain adjuncts, i.e., MXD6, would have an impact on the clarity and optical properties of the resulting PET polymer comprising container.

Therefore, there is a need for providing increased shelf life for carbonated beverages that does not involve increasing the thickness of the container walls, applying an expensive coating, admixing ingredients that impact container clarity, or any combination to these limitations.

SUMMARY

Disclosed herein are polymer compositions, comprising:
a) a base polymer;
b) from about 0.1% to about 10% by weight of a compound having the formula:

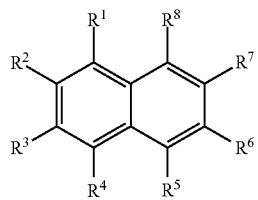

wherein $R^1$ to $R^8$ are each independently chosen from:
i) hydrogen;
ii) $C_1$-$C_{12}$ substituted or unsubstituted linear, branched, or cyclic alkyl;
iii) $C_2$-$C_{12}$ substituted or unsubstituted linear, branched, or cyclic alkenyl;
iv) $C_2$-$C_{12}$ substituted or unsubstituted linear or branched alkynyl;
v) $C_6$ or $C_{10}$ substituted or unsubstituted aryl;
vi) $C_1$-$C_9$ substituted or unsubstituted heterocyclic;
vii) $C_1$-$C_{11}$ substituted or unsubstituted heteroaryl;
viii) —[C($R^{10a}$)($R^{10b}$)]$_y$O$R^{11}$;
   wherein $R^{11}$ is chosen from:
   a) —H;
   b) $C_1$-$C_{12}$ substituted or unsubstituted linear, branched, or cyclic alkyl or $C_1$-$C_{12}$ substituted or unsubstituted linear, branched, or cyclic haloalkyl;
   c) $C_6$ or $C_{10}$ substituted or unsubstituted aryl or $C_7$-$C_{20}$ alkylenearyl;
   d) $C_1$-$C_9$ substituted or unsubstituted heterocyclic; and
   e) $C_1$-$C_{11}$ substituted or unsubstituted heteroaryl;
ix) —[C($R^{10a}$)($R^{10b}$)]$_y$N($R^{12a}$)($R^{12b}$);
   wherein $R^{12a}$ and $R^{12b}$ are each independently chosen from:
   a) —H;
   b) —O$R^{13}$;
      $R^{13}$ is hydrogen or $C_1$-$C_4$ linear alkyl;
   c) $C_1$-$C_{12}$ substituted or unsubstituted linear, branched, or cyclic alkyl;
   d) $C_6$ or $C_{10}$ substituted or unsubstituted aryl;
   e) $C_1$-$C_9$ substituted or unsubstituted heterocyclic;
   f) $C_1$-$C_{11}$ substituted or unsubstituted heteroaryl; and
   g) $R^{12a}$ and $R^{12b}$ can be taken together to form a substituted or unsubstituted ring having from 3 to 10 carbon atoms and from 0 to 3 heteroatoms chosen from oxygen, nitrogen, and sulfur;
x) —[C($R^{10a}$)($R^{10b}$)]$_y$C(O)$R^{14}$;
   wherein $R^{14}$ is chosen from:
   a) $C_1$-$C_{12}$ substituted or unsubstituted linear, branched, or cyclic alkyl;
   b) —O$R^{15}$;
      wherein $R^{15}$ is hydrogen, substituted or unsubstituted $C_1$-$C_4$ linear alkyl, $C_6$ or $C_{10}$ substituted or unsubstituted aryl, $C_1$-$C_9$ substituted or unsubstituted heterocyclic, $C_1$-$C_{11}$ substituted or unsubstituted heteroaryl; and
   c) —N($R^{16a}$)($R^{16b}$);
      wherein $R^{16a}$ and $R^{16b}$ are each independently hydrogen, $C_1$-$C_{12}$ substituted or unsubstituted linear, branched, or cyclic alkyl; $C_6$ or $C_{10}$ substituted or unsubstituted aryl; $C_1$-$C_9$ substituted or unsubstituted heterocyclic; $C_1$-$C_{11}$ substituted or unsubstituted heteroaryl; or $R^{16a}$ and $R^{16b}$ can be taken together to form a substituted or unsubstituted ring having from 3 to 10 carbon atoms and from 0 to 3 heteroatoms chosen from oxygen, nitrogen, and sulfur;
xi) —[C($R^{10a}$)($R^{10b}$)]$_y$OC(O)$R^{17}$;
   wherein $R^{17}$ is chosen from:
   a) $C_1$-$C_{12}$ substituted or unsubstituted linear, branched, or cyclic alkyl; and
   b) —N($R^{18a}$)($R^{18b}$);
      $R^{18a}$ and $R^{18b}$ are each independently hydrogen, $C_1$-$C_{12}$ substituted or unsubstituted linear, branched, or cyclic alkyl; $C_6$ or $C_{10}$ substituted or unsubstituted aryl; $C_1$-$C_9$ substituted or unsubstituted heterocyclic; $C_1$-$C_{11}$ substituted or unsubstituted heteroaryl; or $R^{18a}$ and $R^{18b}$ can be taken together to form a substituted or unsubstituted ring having from 3 to 10 carbon atoms and from 0 to 3 heteroatoms chosen from oxygen, nitrogen, and sulfur;
xii) —[C($R^{10a}$)($R^{10b}$)]$_y$N$R^{19}$C(O)$R^{20}$;
   wherein $R^{18}$ is chosen from:
   a) —H; and
   b) $C_1$-$C_4$ substituted or unsubstituted linear, branched, or cyclic alkyl;

wherein $R^{20}$ is chosen from:
a) $C_1$-$C_{12}$ substituted or unsubstituted linear, branched, or cyclic alkyl; and
b) —$N(R^{21a})(R^{21b})$;
  $R^{21a}$ and $R^{21b}$ are each independently hydrogen, $C_1$-$C_{12}$ substituted or unsubstituted linear, branched, or cyclic alkyl; $C_6$ or $C_{10}$ substituted or unsubstituted aryl; $C_1$-$C_9$ substituted or unsubstituted heterocyclic; substituted or unsubstituted heteroaryl; or $R^{21a}$ and $R^{21b}$ can be taken together to form a substituted or unsubstituted ring having from 3 to 10 carbon atoms and from 0 to 3 heteroatoms chosen from oxygen, nitrogen, and sulfur;

xiii) —$[C(R^{10a})(R^{10b})]_y CN$;
xiv) —$[C(R^{10a})(R^{10b})]_y NO_2$;
xv) —$[C(R^{10a})(R^{10b})]_y SO_2 R^{22}$;
  $R^{22}$ is hydrogen, hydroxyl, substituted or unsubstituted $C_1$-$C_4$ linear or branched alkyl; substituted or unsubstituted $C_6$, $C_{10}$, or $C_{14}$ aryl; $C_7$-$C_{15}$ alkylenearyl; $C_1$-$C_9$ substituted or unsubstituted heterocyclic; or $C_1$-$C_{11}$ substituted or unsubstituted heteroaryl; and
xvi) halogen;
xvii) —$[C(R^{10a})(R^{10b})]_y (CH_j X_{k'})_h CH_{j'} X_{k'}$; wherein X is halogen, the index j is an integer from 0 to 2, the index k is an integer from 1 to 3, j+k=3; the index j' is an integer from 0 to 2, the index k' is and integer from 0 to 2, j'+k'=2; the index h is from 0 to 5;
  $R^{10a}$ and $R^{10b}$ are each independently hydrogen or $C_1$-$C_4$ alkyl; and
  the index y is from 0 to 5;
$R^1$ and $R^8$ can be taken together to from a 5 to 7 member ring containing from 3 to 7 carbon atoms and from 0 to 2 heteroatoms chosen from oxygen, sulfur, or nitrogen, wherein one or more of the carbon atoms can be substituted, unsubstituted, or a carbonyl unit.

Also disclosed herein are methods of making the compositions, articles comprising the compositions, and methods of making the articles.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

FIG. 2(a) shows representative $CO_2$ loss data for the disclosed polymer compositions as described below in Example 1.

FIG. 2(b) shows representative $CO_2$ loss data for the disclosed polymer compositions as described below in Example 1.

FIG. 3(a) shows representative $CO_2$ loss data for the disclosed polymer compositions as described below in Example 1.

FIG. 3(b) shows representative $CO_2$ loss data for the disclosed polymer compositions as described below in Example 1.

DETAILED DESCRIPTION

Figure 1:
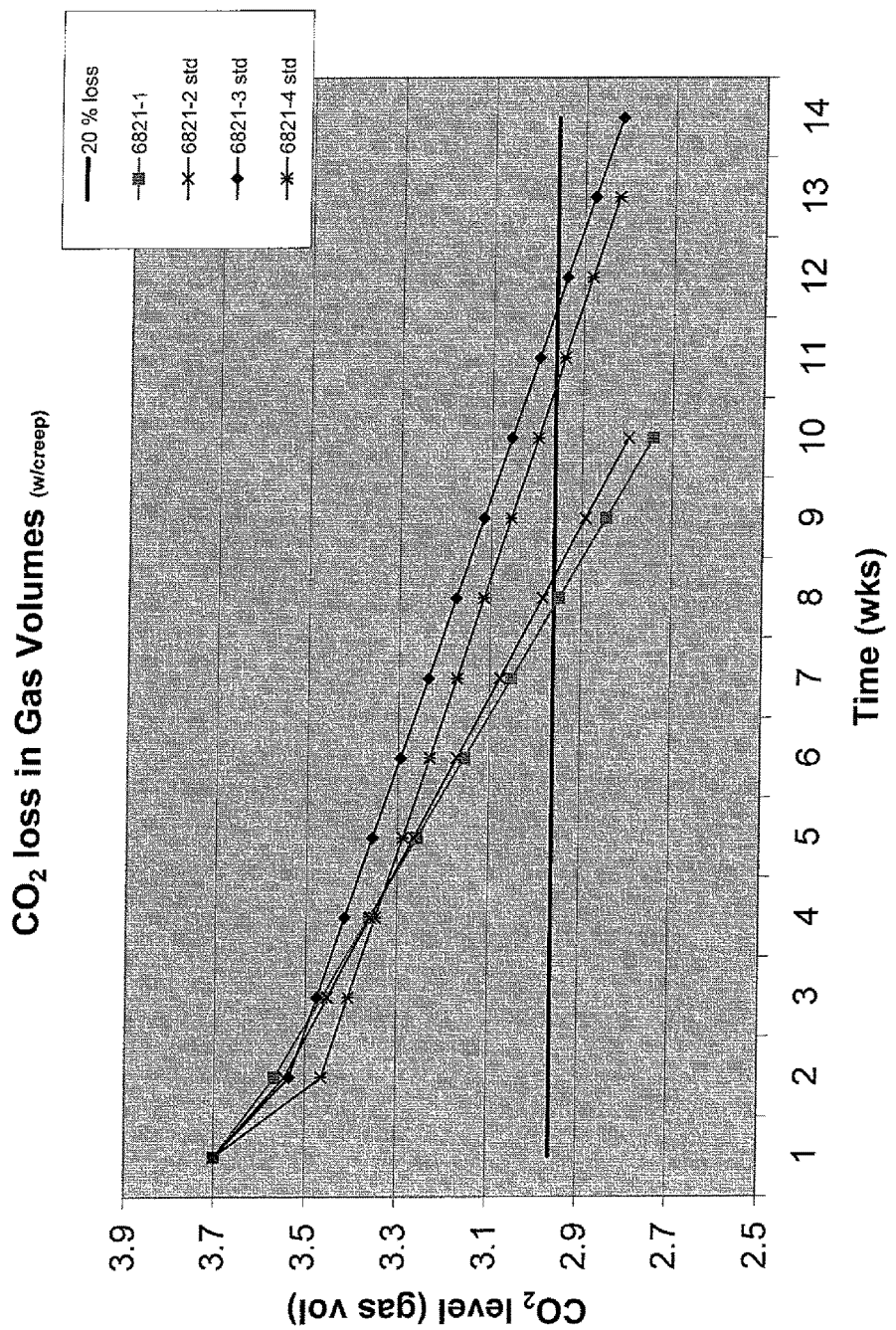
FIG. 1 shows representative $CO_2$ loss data for the disclosed polymer compositions as described below in Example 1.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

In this specification and in the claims that follow, reference will be made to a number of terms, which shall be defined to have the following meanings:

All percentages, ratios and proportions herein are by weight, unless otherwise specified. All temperatures are in degrees Celsius (° C.) unless otherwise specified.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "a phenylsulfamic acid" includes mixtures of two or more such phenylsulfamic acids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "star polymer" refers to a branched polymer molecule in which a single branch point gives rise to multiple linear chains or arms. The single branch point can be a single chemical moiety or can be a highly crosslinked section of polymer. In one aspect, a star polymer can be generally spherical in shape. In a further aspect, a star polymer can be particle shaped. If the arms are identical the star polymer molecule is said to be regular. If adjacent arms are composed of different repeating subunits, the star polymer molecule is said to be variegated.

As used herein, the term "molecular weight" (MW) refers to the mass of one molecule of that substance, relative to the unified atomic mass unit u (equal to 1/12 the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w on average. The weight average molecular weight can be determined by light scattering, small angle neutron scattering (SANS), X-ray scattering, and sedimentation velocity.

As used herein, the terms "polydispersity" and "polydispersity index" (PDI) refer to the ratio of the weight average to the number average ($M_w/M_n$).

As used herein, the term "compatibilizing agent" refers to a small molecule or polymer that has both polar and non-polar functional groups. For example, a fatty-acid ester has both polar and non-polar functional groups.

A weight percent (wt. %) of a component, unless specifically stated to the contrary, is based on the total weight of the formulation or composition in which the component is included.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

The following chemical hierarchy is used throughout the specification to describe and enable the scope of the present disclosure and to particularly point out and distinctly claim the units which comprise the compounds of the present disclosure, however, unless otherwise specifically defined, the terms used herein are the same as those of the artisan of ordinary skill. The term "hydrocarbyl" stands for any carbon atom-based unit (organic molecule), said units optionally containing one or more organic functional group, including inorganic atom comprising salts, inter alia, carboxylate salts, quaternary ammonium salts. Within the broad meaning of the term "hydrocarbyl" are the classes "acyclic hydrocarbyl" and "cyclic hydrocarbyl" which terms are used to divide hydrocarbyl units into cyclic and non-cyclic classes.

As it relates to the following definitions, "cyclic hydrocarbyl" units can comprise only carbon atoms in the ring (i.e., carbocyclic and aryl rings) or can comprise one or more heteroatoms in the ring (i.e., heterocyclic and heteroaryl rings). For "carbocyclic" rings the lowest number of carbon atoms in a ring are 3 carbon atoms; cyclopropyl. For "aryl" rings the lowest number of carbon atoms in a ring are 6 carbon atoms; phenyl. For "heterocyclic" rings the lowest number of carbon atoms in a ring is 1 carbon atom; diazirinyl. Ethylene oxide comprises 2 carbon atoms and is a $C_2$ heterocycle. For "heteroaryl" rings the lowest number of carbon atoms in a ring is 1 carbon atom; 1,2,3,4-tetrazolyl. The following is a non-limiting description of the terms "acyclic hydrocarbyl" and "cyclic hydrocarbyl" as used herein.

A. Substituted and Unsubstituted Acyclic Hydrocarbyl:
For the purposes of the present disclosure the term "substituted and unsubstituted acyclic hydrocarbyl" encompasses 3 categories of units:
1) linear or branched alkyl, non-limiting examples of which include, methyl ($C_1$), ethyl ($C_2$), n-propyl ($C_3$), iso-propyl ($C_3$), n-butyl ($C_4$), sec-butyl ($C_4$), iso-butyl ($C_4$), tert-butyl ($C_4$), and the like; substituted linear or branched alkyl, non-limiting examples of which includes, hydroxymethyl ($C_1$), chloromethyl ($C_1$), trifluoromethyl ($C_1$), aminomethyl ($C_1$), 1-chloroethyl ($C_2$), 2-hydroxyethyl ($C_2$), 1,2-difluoroethyl ($C_2$), 3-carboxypropyl ($C_3$), and the like.
2) linear or branched alkenyl, non-limiting examples of which include, ethenyl ($C_2$), 3-propenyl ($C_3$), 1-propenyl (also 2-methylethenyl) ($C_3$), isopropenyl (also 2-methylethen-2-yl) ($C_3$), buten-4-yl ($C_4$), and the like; substituted linear or branched alkenyl, non-limiting examples of which include, 2-chloroethenyl (also 2-chlorovinyl) ($C_2$), 4-hydroxybuten-1-yl ($C_4$), 7-hydroxy-7-methyloct-4-en-2-yl ($C_9$), 7-hydroxy-7-methyloct-3,5-dien-2-yl ($C_9$), and the like.
3) linear or branched alkynyl, non-limiting examples of which include, ethynyl ($C_2$), prop-2-ynyl (also propargyl) ($C_3$), propyn-1-yl ($C_3$), and 2-methyl-hex-4-yn-1-yl ($C_7$); substituted linear or branched alkynyl, non-limiting examples of which include, 5-hydroxy-5-methylhex-3-ynyl ($C_7$), 6-hydroxy-6-methylhept-3-yn-2-yl ($C_8$), 5-hydroxy-5-ethylhept-3-ynyl ($C_9$), and the like.

B. Substituted and Unsubstituted Cyclic Hydrocarbyl:
For the purposes of the present disclosure the term "substituted and unsubstituted cyclic hydrocarbyl" encompasses 5 categories of units:
1) The term "carbocyclic" is defined herein as "encompassing rings comprising from 3 to 20 carbon atoms, wherein the atoms which comprise said rings are limited to carbon atoms, and further each ring can be independently substituted with one or more moieties capable of replacing one or more hydrogen atoms." The following are non-limiting examples of "substituted and unsubstituted carbocyclic rings" which encompass the following categories of units:
  i) carbocyclic rings having a single substituted or unsubstituted hydrocarbon ring, non-limiting examples of which include, cyclopropyl ($C_3$), 2-methyl-cyclopropyl ($C_3$), cyclopropenyl ($C_3$), cyclobutyl ($C_4$), 2,3-dihydroxycyclobutyl ($C_4$), cyclobutenyl ($C_4$), cyclopentyl ($C_5$), cyclopentenyl ($C_5$), cyclopentadienyl ($C_5$), cyclohexyl ($C_6$), cyclohexenyl ($C_6$), cycloheptyl ($C_7$), cyclooctanyl ($C_8$), 2,5-dimethylcyclopentyl ($C_5$), 3,5-dichlorocyclohexyl ($C_6$), 4-hydroxycyclohexyl ($C_6$), and 3,3,5-trimethylcyclohex-1-yl ($C_6$).
  ii) carbocyclic rings having two or more substituted or unsubstituted fused hydrocarbon rings, non-limiting examples of which include, octahydropentalenyl ($C_8$), octahydro-1H-indenyl ($C_9$), 3a,4,5,6,7,7a-hexahydro-3H-inden-4-yl ($C_9$), decahydroazulenyl ($C_{10}$).
  iii) carbocyclic rings which are substituted or unsubstituted bicyclic hydrocarbon rings, non-limiting examples of which include, bicyclo-[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl.
2) The term "aryl" is defined herein as "units encompassing at least one phenyl or naphthyl ring and wherein there are no heteroaryl or heterocyclic rings fused to the phenyl or naphthyl ring and further each ring can be independently substituted with one or more moieties capable of replacing one or more hydrogen atoms." The following are non-limiting examples of "substituted and unsubstituted aryl rings" which encompass the following categories of units:
  i) $C_6$ or $C_{10}$ substituted or unsubstituted aryl rings; phenyl and naphthyl rings whether substituted or unsubstituted, non-limiting examples of which include, phenyl ($C_6$), naphthylen-1-yl ($C_{10}$), naphthylen-2-yl ($C_{10}$), 4-fluorophenyl ($C_6$), 2-hydroxyphenyl ($C_6$), 3-methylphenyl ($C_6$), 2-amino-4-fluorophenyl ($C_6$), 2-(N,N-diethylamino)phenyl ($C_6$), 2-cyanophenyl ($C_6$), 2,6-di-tert-butylphenyl ($C_6$), 3-methoxyphenyl ($C_6$), 8-hydroxynaphthylen-2-yl ($C_{10}$), 4,5-dimethoxynaphthylen-1-yl ($C_{10}$), and 6-cyano-naphthylen-1-yl ($C_{10}$).
  ii) $C_6$ or $C_{10}$ aryl rings fused with 1 or 2 saturated rings to afford $C_8$-$C_{20}$ ring systems, non-limiting examples of which include, bicyclo[4.2.0]octa-1,3,5-trienyl ($C_8$), and indanyl ($C_9$).
3) The terms "heterocyclic" and/or "heterocycle" are defined herein as "units comprising one or more rings having from 3 to 20 atoms wherein at least one atom in at least one ring is a heteroatom chosen from nitrogen (N), oxygen (O), or sulfur (S), or mixtures of N, O, and S, and wherein further the ring which contains the heteroatom is also not an aromatic ring." The following are non-limiting examples of "substituted and unsubstituted heterocyclic rings" which encompass the following categories of units:
  i) heterocyclic units having a single ring containing one or more heteroatoms, non-limiting examples of which include, diazirinyl ($C_1$), aziridinyl ($C_2$), urazolyl ($C_2$), azetidinyl ($C_3$), pyrazolidinyl ($C_3$), imidazolidinyl ($C_3$), oxazolidinyl ($C_3$), isoxazolinyl ($C_3$), thiazolidinyl ($C_3$), isothiazolinyl ($C_3$), oxathiazolidinonyl ($C_3$), oxazolidinonyl ($C_3$), hydantoinyl ($C_3$), tetrahydrofuranyl ($C_4$), pyrrolidinyl ($C_4$), morpholinyl ($C_4$), piperazinyl ($C_4$), piperidinyl ($C_4$), dihydropyranyl ($C_5$), tetrahydropyranyl ($C_5$), piperidin-2-onyl (valerolactam) ($C_5$), 2,3,4,5-tetrahydro-1H-azepinyl ($C_6$), 2,3-dihydro-1H-indole ($C_8$), and 1,2,3,4-tetrahydroquinoline ($C_9$).
  ii) heterocyclic units having 2 or more rings one of which is a heterocyclic ring, non-limiting examples of which include hexahydro-1H-pyrrolizinyl ($C_7$), 3a,4,5,6,7,7a-hexahydro-1H-benzo[d]imidazolyl ($C_7$), 3a,4,5,6,7,7a- hexahydro-1H-indolyl ($C_8$), 1,2,3,4-tetrahydroquinolinyl ($C_9$), and decahydro-1H-cycloocta[b]pyrrolyl ($C_{10}$).

4) The term "heteroaryl" is defined herein as "encompassing one or more rings comprising from 5 to 20 atoms wherein at least one atom in at least one ring is a heteroatom chosen from nitrogen (N), oxygen (O), or sulfur (S), or mixtures of N, O, and S, and wherein further at least one of the rings which comprises a heteroatom is an aromatic ring." The following are non-limiting examples of "substituted and unsubstituted heterocyclic rings" which encompass the following categories of units:
   i) heteroaryl rings containing a single ring, non-limiting examples of which include, 1,2,3,4-tetrazolyl ($C_1$), [1,2,3]triazolyl ($C_2$), [1,2,4]triazolyl ($C_2$), triazinyl ($C_3$), thiazolyl ($C_3$), 1H-imidazolyl ($C_3$), oxazolyl ($C_3$), isoxazolyl ($C_3$), isothiazolyl ($C_3$), furanyl ($C_4$), thiophenyl ($C_4$), pyrimidinyl ($C_4$), 2-phenylpyrimidinyl ($C_4$), pyridinyl ($C_5$), 3-methylpyridinyl ($C_5$), and 4-dimethylaminopyridinyl ($C_5$)
   ii) heteroaryl rings containing 2 or more fused rings one of which is a heteroaryl ring, non-limiting examples of which include: 7H-purinyl ($C_5$), 9H-purinyl ($C_5$), 6-amino-9H-purinyl ($C_5$), 5H-pyrrolo[3,2-d]pyrimidinyl ($C_6$), 7H-pyrrolo[2,3-d]pyrimidinyl ($C_6$), pyrido[2,3-d]pyrimidinyl ($C_7$), 2-phenylbenzo[d]thiazolyl ($C_7$), 1H-indolyl ($C_8$), 4,5,6,7-tetrahydro-1-H-indolyl ($C_8$), quinoxalinyl ($C_8$), 5-methylquinoxalinyl ($C_8$), quinazolinyl ($C_8$), quinolinyl ($C_9$), 8-hydroxy-quinolinyl ($C_9$), and isoquinolinyl ($C_9$).

5) $C_1$-$C_6$ tethered cyclic hydrocarbyl units (whether carbocyclic units, $C_6$ or $C_{10}$ aryl units, heterocyclic units, or heteroaryl units) which connected to another moiety, unit, or core of the molecule by way of a $C_1$-$C_6$ alkylene unit. Non-limiting examples of tethered cyclic hydrocarbyl units include benzyl $C_1$—($C_6$) having the formula:

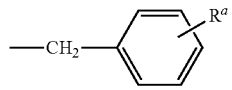

wherein $R^a$ is optionally one or more independently chosen substitutions for hydrogen. Further examples include other aryl units, inter alia, (2-hydroxyphenyl)hexyl $C_6$—($C_6$); naphthalen-2-ylmethyl $C_1$—($C_{10}$), 4-fluorobenzyl $C_1$—($C_6$), 2-(3-hydroxyphenyl)ethyl $C_2$—($C_6$), as well as substituted and unsubstituted $C_3$-$C_{10}$ alkylenecarbocyclic units, for example, cyclopropylmethyl $C_1$—($C_3$), cyclopentylethyl $C_2$—($C_5$), cyclohexylmethyl $C_1$—($C_6$). Included within this category are substituted and unsubstituted $C_1$-$C_{10}$ alkylene-heteroaryl units, for example a 2-picolyl $C_1$—($C_6$) unit having the formula:

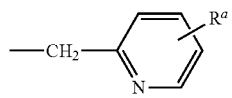

wherein $R^a$ is the same as defined above. In addition, $C_1$-$C_{12}$ tethered cyclic hydrocarbyl units include $C_1$-$C_{10}$ alkyleneheterocyclic units and alkylene-heteroaryl units, non-limiting examples of which include, aziridinylmethyl $C_1$—($C_2$) and oxazol-2-ylmethyl $C_1$—($C_3$).

For the purposes of the present disclosure carbocyclic rings are from $C_3$ to $C_{20}$; aryl rings are $C_6$ or $C_{10}$; heterocyclic rings are from $C_1$ to $C_9$; and heteroaryl rings are from $C_1$ to $C_9$.

For the purposes of the present disclosure, and to provide consistency in defining the present disclosure, fused ring units, as well as spirocyclic rings, bicyclic rings and the like, which comprise a single heteroatom will be characterized and referred to herein as being encompassed by the cyclic family corresponding to the heteroatom containing ring, although the artisan may have alternative characterizations. For example, 1,2,3,4-tetrahydroquinoline having the formula:

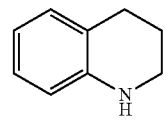

is, for the purposes of the present disclosure, considered a heterocyclic unit. 6,7-Dihydro-5H-cyclopentapyrimidine having the formula:

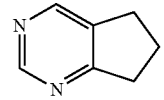

is, for the purposes of the present disclosure, considered a heteroaryl unit. When a fused ring unit contains heteroatoms in both a saturated ring (heterocyclic ring) and an aryl ring (heteroaryl ring), the aryl ring will predominate and determine the type of category to which the ring is assigned herein for the purposes of describing the invention. For example, 1,2,3,4-tetrahydro-[1,8]naphthpyridine having the formula:

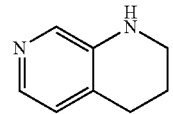

is, for the purposes of the present disclosure, considered a heteroaryl unit.

The term "substituted" is used throughout the specification. The term "substituted" is applied to the units described herein as "substituted unit or moiety is a hydrocarbyl unit or moiety, whether acyclic or cyclic, which has one or more hydrogen atoms replaced by a substituent or several substituents as defined herein below." The units, when substituting for hydrogen atoms are capable of replacing one hydrogen atom, two hydrogen atoms, or three hydrogen atoms of a hydrocarbyl moiety at a time. In addition, these substituents can replace two hydrogen atoms on two adjacent carbons to form said substituent, new moiety, or unit. For example, a substituted unit that requires a single hydrogen atom replacement includes halogen, hydroxyl, and the like. A two hydrogen atom replacement includes carbonyl, oximino, and the like. A two hydrogen atom replacement from adjacent carbon atoms includes epoxy, and the like.

Three hydrogen replacement includes cyano, and the like. The term substituted is used throughout the present specification to indicate that a hydrocarbyl moiety, inter alia, aromatic ring, alkyl chain; can have one or more of the hydrogen atoms replaced by a substituent. When a moiety is described as "substituted" any number of the hydrogen atoms may be replaced. For example, 4-hydroxyphenyl is a "substituted aromatic carbocyclic ring (aryl ring)", (N,N-dimethyl-5-amino)octanyl is a "substituted $C_8$ linear alkyl unit, 3-guanidinopropyl is a "substituted $C_3$ linear alkyl unit," and 2-carboxypyridinyl is a "substituted heteroaryl unit."

Polymer Compositions

Disclosed herein are polymer compositions, comprising
a) a base polymer;
b) from about 0.1% to about 10% by weight of an oxygen scavenger; and
c) from about 0.1% to about 10% by weight of a compound further described herein below.

Base Polymers

The disclosed compositions comprise a base polymer. The base polymer can comprise one or more homopolymers or copolymers as described herein. The compositions can comprise from about 80% to about 99.98% by weight of a base polymer. In one embodiment the composition comprises from about 80% to about 99% by weight of a base polymer. In another embodiment the composition comprises from about 85% to about 99% by weight of a base polymer. In a further embodiment the composition comprises from about 90% to about 99.98% by weight of a base polymer. In a yet further embodiment the composition comprises from about 95% to about 99% by weight of a base polymer. In a still further embodiment the composition comprises from about 95% to about 99.98% by weight of a base polymer. In a yet another embodiment the composition comprises from about 97% to about 99% by weight of a base polymer.

A variety of different polymers can be used as the base polymer. The disclosed compositions enable oxygen scavenging, and thus the base polymer generally includes those polymers that can be subject to oxidation. For example, polymers that exhibit at least some oxygen permeability are useful with the disclosed compositions, at least inasmuch as the disclosed compositions can reduce the oxidative damage to the polymer.

The base polymer can be a polymer commonly used in packaging materials including polyethylene, such as low density polyethylene, very low density polyethylene, ultra-low density polyethylene, high density polyethylene, and linear low density polyethylene; polyesters such as (PET), (PEN) and their copolymers such as PET/IP; polyvinyl chloride (PVC); polyvinylidene chloride (PVDC); and ethylene copolymers such as ethylene/vinyl acetate copolymer, ethylene/alkyl (meth)acrylate copolymers, ethylene/(meth) acrylic acid copolymers, and ionomers. Blends of different base polymers also can be used.

In a further aspect, the base polymer can include one or more polymers approved by the U.S. Food and Drug Administration (FDA). Examples include polyethylene terephthalate, polypropylene, and polyethylene.

In a further aspect, the base polymer comprises a polyester polymer or copolymer. Preferred polyesters include polymers of phthalic acids, such as polyethylene terephthalate (PET), or a copolymer thereof. PET, for example, can be made from terephthalic acid and ethylene glycol. PET can also be made using dimethyl terephthalate and ethylene glycol. Preferred copolymers of phthalic acids include copolymers of a phthalic acid and one or more hydroxylated organic compounds. Examples of suitable hydroxylated organic compounds include 1,4-cyclohexandedimethanol, 1,2-propanediol, 1,4-butanediol, 2,2-dimethyl-1,3-propanediol, 2-methyl-1,3-propanediol (2 MPDO), 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol, or mixtures of these, and the like.

In a still further aspect, the base polymer includes a polyethylene terephthalate homopolymer and copolymer modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less and polyethylene naphthalate homopolymers and copolymers modified with a cumulative amount of less than about 15 mole %, or about 10 mole % or less, or about 8 mole % or less, of one or more polycarboxylic acid modifiers or modified with less than about 60 mol %, or less than about 50 mole %, or less than about 40 mole %, or less than about 15 mole %, or about 10 mole % or less, or about 8 mole % or less of one or more hydroxyl compound modifiers, and blends thereof. In some aspects, the base polymer comprises at least 90 mole %, 92 mole %, or 94 mole % ethylene terephthalate repeat units based on the moles of all repeat units in the polyester polymers.

Polyesters such as PET can be prepared by polymerization procedures known in the art sufficient to effect esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

Oxygen Scavenger

The compositions comprise from about 0.10% to about 10% weight percent of the oxygen scavenger. In one embodiment the compositions comprise from about 0.5% to about 10% by weight of an oxygen scavenger. In another embodiment the compositions comprise from about 1% to about 5% by weight of an oxygen scavenger. In a further embodiment the compositions comprise from about 0.1% to about 1% by weight of an oxygen scavenger. In a still further embodiment the compositions comprise from about 0.1% to about 5% by weight of an oxygen scavenger. In a yet further embodiment the compositions comprise from about 3% to about 10% by weight of an oxygen scavenger. In another further embodiment the compositions comprise from about 5% to about 10% by weight of an oxygen scavenger. In a yet another embodiment the compositions comprise from about 2% to about 7% by weight of an oxygen scavenger.

Preferably, the oxygen scavenger is an N-allylic oxygen scavenger or N-benzylic oxygen scavenger. The oxygen scavenger can function as an oxygen scavenger in the composition. The oxygen scavenging ability of the oxygen scavenger can be enhanced by the transition metal.

N-allylic or N-benzylic oxygen scavengers have the general structure shown below:

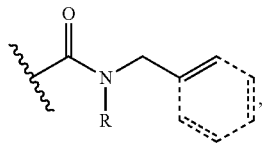

wherein each - - - independently denotes an optional covalent bond.

It is also appreciated that an N-allylic or N-benzylic oxygen scavenger can be further substituted and that more than one amide functionality can be present in a compound. In one aspect, an N-allylic or N-benzylic oxygen scavenger can be polymeric. In a further aspect, an N-allylic or N-benzylic oxygen scavenger can be nonpolymeric.

Generally, the oxygen scavenger is present in the composition in an amount of from 0.1 to about 10 weight percent. In one aspect, the oxygen scavenger is present in the composition in an amount of from 1 to about 10 weight percent. In a further aspect, the oxygen scavenger is present in the composition in an amount of from 1 to about 5 weight percent. In a further aspect, the oxygen scavenger is present in the composition in an amount of from 1 to about 3 weight percent.

In one aspect, the oxygen scavenger has a structure of Formula I:

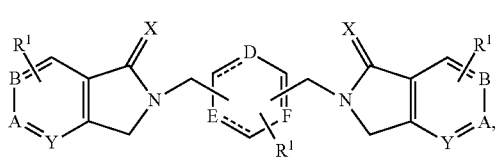

(I)

wherein each X is selected from the group consisting of O, S, and NH; wherein each Y, each A, and each B are independently selected from the group consisting of N and $CR^1$; wherein D, E, and F are independently selected from the group consisting of CH, N, O, and S; wherein the symbol - - - when used in conjunction with a bond line represents a single or a double bond; and wherein each $R^1$ is independently selected from the group consisting of H, alkyl, aryl, electron withdrawing groups, and electron releasing groups.

In a further aspect, the oxygen scavenger has a structure of Formula II:

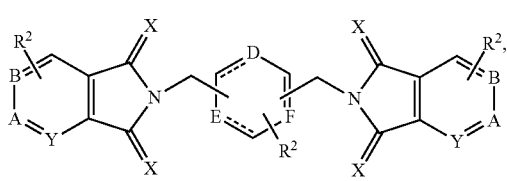

(II)

wherein each X is selected from the group consisting of O, S, and NH; wherein each Y, each A, and each B are independently selected from the group consisting of N and $CR^2$; wherein D, E, and F are independently selected from the group consisting of CH, N, O, and S; wherein the symbol - - - when used in conjunction with a bond line represents a single or a double bond; and wherein each $R^2$ is independently selected from the group consisting of H, alkyl, aryl, electron withdrawing groups, and electron releasing groups.

The alkyl group of Formula (I) or (II) can be a branched or unbranched saturated hydrocarbon group of 1 to 24 carbon atoms, e.g. 1 to 18 carbons atoms, 1 to 14 carbon atoms, 1 to 12 carbon atoms, 1 to 10 carbon atoms, 1 to 8, 1 to 6 carbon atoms, or 1 to 4 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. The alkyl group can be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol, as described below. The alkyl group can be halogenated, which includes an alkyl group that is substituted with one or more halide, e.g., fluorine, chlorine, bromine, or iodine. The alkyl group can also be a lower alkyl group, which is an alkyl group containing from one to six (e.g., from one to four) carbon atoms.

The aryl group of Formula (I) or (II) can be any carbon-based aromatic group including but not limited to, benzene, naphthalene, phenyl, biphenyl, etc. The aryl group can also be heteroaryl, which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, halide, hydroxamate, hydroxy, ketone, nitro, silyl, sulfo-oxo, sulfonyl, sulfone, sulfoxide, or thiol as described herein. A biaryl group is a specific type of aryl group and is included in the definition of aryl. Biaryl refers to two aryl groups that are bound together via a fused ring structure, as in naphthalene, or are attached via one or more carbon-carbon bonds, as in biphenyl.

Suitable electron withdrawing groups and electron releasing groups are generally known in the art. Preferred electron withdrawing groups include nitro, carboxylic acid, esters, for example loweralkyl esters, and cyano. Preferred electron releasing groups include branched and straight chain alkyl groups, for example, methyl, ethyl, propyl, isopropyl, butyl, isobutyl, and tert-butyl. Other preferred electron releasing groups include alkoxy, for example methoxy and ethoxy. Other preferred electron releasing groups include thioalkyl. Still other preferred electron releasing groups include amines, for example —$NH_2$, and NH(loweralkyl), and N(loweralkyl)$_2$.

Preferred oxygen scavengers of Formula (I) and (II) are disclosed in U.S. Patent Application Publication No. 20080277622, Deshpande et al. "Oxygen Scavenging Molecules, Articles Containing Same, And Methods of Their Use," which is incorporated herein by this reference for its teaching of oxygen scavengers, their preparation, and their use as oxygen scavenging materials.

In a further aspect, the oxygen scavenger is polymeric or copolymeric and comprises a structure of Formula III:

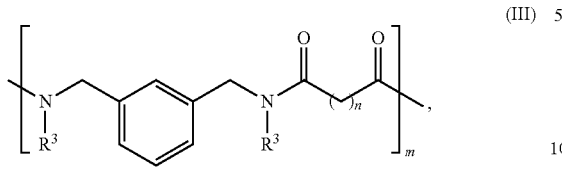
(III)

wherein m is a positive integer greater than 10; wherein n is an integer from 1 to 6; and wherein $R^3$ is H or C1-C4 alkyl. The C1-C4 alkyl group can be substituted or unsubstituted methyl, ethyl, propyl, butyl, isopropyl, or isobutyl. In a further aspect, $R^3$ is H. In one aspect, n is 4. One example of a compound of Formula III is MXD6 (available commercially, e.g., from Mitsubishi Gas Chemicals of Japan). MXD6 is a polymer produced by condensation of meta-xylylene diamine and adipic acid. Compounds of Formula III can be obtained from commercial sources or be prepared by polymerization methods known in the art. Suitable grades include HB-5299 from EMS Grivory; 6001, 6003, 6007 and 6121 from Mitsubishi Gas and Chemical Company.

In one aspect, the oxygen scavenger has a structure of Formula I: the oxygen scavenger has a structure represented by a formula:

$$E\text{-}(L\text{-}E)_x$$

wherein x is 0, 1, or 2; wherein E has a structure of Formula IV or Formula V:

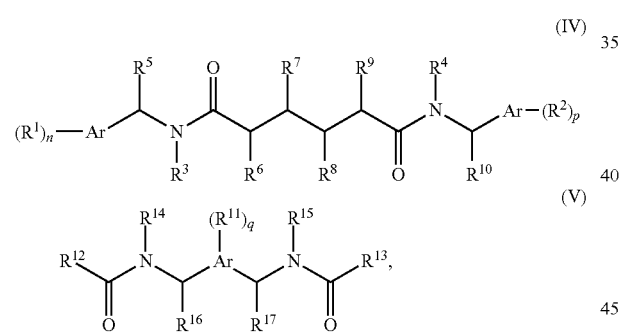

wherein L is a linking group of the formula —(O—$R^{21}$)$_z$—O—, —(NH—$R^{21}$)$_z$—NH—, —(NH—C(=O)$R^{22}$)$_t$—NH, —NH—$R^{25}$—NH(C(=O)$R^{26}$NH$R^{25}$NH)$_u$—, —(O—$R^{23}$—O—$R^{24}$—C(=O))$_s$—O)— where L is attached to a carbon atom of at least one Ar in Formula IV or where $R^{12}$ and/or $R^{13}$ of Formula V is L; wherein Ar is aryl or heteroaryl; wherein $R^1$, $R^2$, and $R^{11}$ are each independently, H, $C_1$-$C_{12}$ alkyl, $C_1$-$C_6$ alkoxy, $C_6$-$C_{20}$ aryloxy, hydroxy, $C_2$-$C_6$ alkenyl, NR$^{19}$R$^{20}$, acetyl, nitro, glyceryl, carbohydrate, —C(=O)H, L, or two $R^1$ or two $R^2$ groups can form a group of the formula —O—$R^{18}$—O; wherein $R^3$, $R^4$, $R^{14}$, and $R^{15}$ are each H; $R^5$ to $R^{10}$ and $R^{16}$, and $R^{17}$ are each, independently, H or $C_1$-$C_3$ alkyl; $R^{12}$ and $R^{13}$ are each, independently, H, $C_1$-$C_6$ alkyl, $C_6$-$C_{20}$ aryl, $C_1$-$C_6$ alkoxy, or L; wherein $R^{18}$ is $C_2$-$C_6$ alkyl; $R^{19}$ and $R^{20}$ are each, independently, H, $C_1$-$C_6$ alkyl, or $C_6$-$C_{20}$ aryl; wherein $R^2$, and $R^{24}$ are each, independently, $C_1$-$C_6$ alkyl; wherein $R^{22}$, $R^{23}$, $R^{25}$ and $R^{26}$ are each, independently, $C_1$-$C_6$ alkyl or $C_6$-$C_{20}$ aryl; wherein n and p are independently 0 or an integer from 1 to 5; wherein q is 0 or an integer from 1 to 4; wherein s and z are independently 1, 2, or 3; and wherein t and u are independently 1 or 2.

In a further aspect, E has a structure of Formula IV:

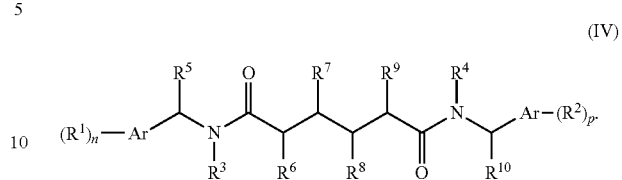

In a further aspect, the oxygen scavenger has a structure represented by a formula:

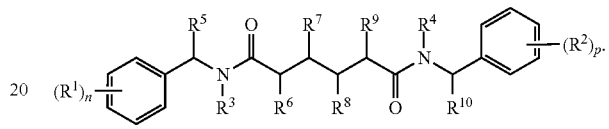

In a further aspect, n and p are each 0, 1, or 2 and R1 and $R^2$ are each independently H, $C_1$-$C_4$ alkyl, hydroxy, $C_1$-$C_3$ alkoxy, or carbohydrate. In a further aspect, $R^1$ and $R^2$ are each independently H, methyl, ethyl, hydroxy, methoxy, ethoxy, or glucose. In a further aspect, $R^5$ to $R^{10}$ are each H. In a further aspect, $R^1$ and $R^2$ are each H. In a further aspect, the oxygen scavenger has a structure represented by a formula:

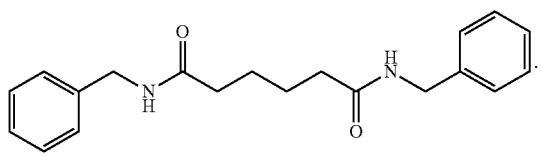 [SMILES: O=C(CCCCC(=O)NCc1ccccc1)NCc1ccccc1]

In a further aspect, E has a structure of Formula V:

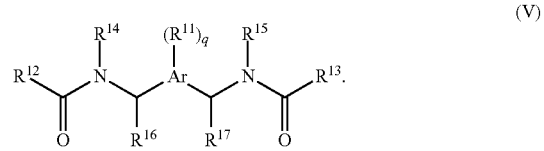

In a further aspect, the oxygen scavenger has a structure represented by a formula:

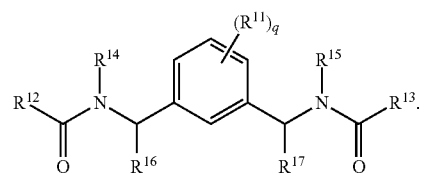

In a further aspect, $R^{16}$ and $R^{17}$ are H. In a further aspect, each $R^{11}$ is independently H, $C_1$-$C_4$ alkyl, hydroxy, or $C_1$-$C_3$ alkoxy, or carbohydrate. In a further aspect, each $R^{11}$ is independently H, methyl, ethyl, hydroxy, methoxy, or ethoxy. In a further aspect, the oxygen scavenger has a structure represented by a formula:

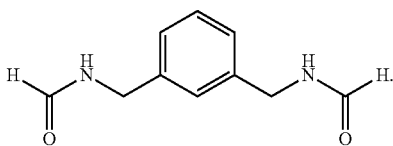

Preferred oxygen scavengers of Formula (Iv) and (V) are disclosed in U.S. Patent Application Publication No. 20060180790, Deshpande et al. "Oxygen scavenging compositions and packaging comprising said compositions," which is incorporated herein by this reference for its teaching of oxygen scavengers, their preparation, and their use as oxygen scavenging materials.

In other aspects, the oxygen scavenger can be any one or more of the conventionally known polybutadiene based oxygen scavengers. Exemplary and non-limiting examples of commercially available polybutadiene based oxygen scavengers include the Amosorb® line of oxygen scavengers available from ColorMatrix of Berea, Ohio, USA.

Compounds

Disclosed herein are compounds capable of being formulated with one or more base polymers wherein the compounds when formulated with the one or more base polymers to provide a polymer composition that can serve as a barrier to slow, retard, or stop the flow of carbon dioxide or water vapor or other gaseous/organoleptic transport through the polymer composition.

The compositions comprise from about 0.10% to about 10% weight percent of the compound. In one embodiment the compositions comprise from about 0.5% to about 10% by weight of an compound. In another embodiment the compositions comprise from about 1% to about 5% by weight of an compound. In a further embodiment the compositions comprise from about 0.1% to about 1% by weight of an compound. In a still further embodiment the compositions comprise from about 0.1% to about 5% by weight of an compound. In a yet further embodiment the compositions comprise from about 3% to about 10% by weight of an compound. In another further embodiment the compositions comprise from about 5% to about 10% by weight of an compound. In a yet another embodiment the compositions comprise from about 2% to about 7% by weight of an compound.

The compounds that can be formulated with the base polymer have the formula:

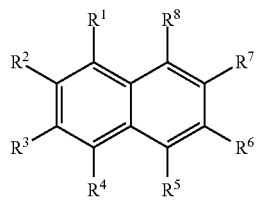

wherein $R^1$ to $R^8$ are each independently chosen from:
i) hydrogen;
ii) $C_1$-$C_{12}$ substituted or unsubstituted linear, branched, or cyclic alkyl;
iii) $C_2$-$C_{12}$ substituted or unsubstituted linear, branched, or cyclic alkenyl;
iv) $C_2$-$C_{12}$ substituted or unsubstituted linear or branched alkynyl;
v) $C_6$ or $C_{10}$ substituted or unsubstituted aryl;
vi) $C_1$-$C_9$ substituted or unsubstituted heterocyclic;
vii) $C_1$-$C_{11}$ substituted or unsubstituted heteroaryl;
viii) —$[C(R^{10a})(R^{10b})]_y OR^{11}$;
wherein $R^{11}$ is chosen from:
a) —H;
b) $C_1$-$C_{12}$ substituted or unsubstituted linear, branched, or cyclic alkyl or $C_1$-$C_{12}$ substituted or unsubstituted linear, branched, or cyclic haloalkyl;
c) $C_6$ or $C_{10}$ substituted or unsubstituted aryl or $C_7$-$C_{20}$ alkylenearyl;
d) $C_1$-$C_9$ substituted or unsubstituted heterocyclic; and
e) $C_1$-$C_{11}$ substituted or unsubstituted heteroaryl;
ix) —$[C(R^{10a})(R^{10b})]_y N(R^{12a})(R^{12b})$;
wherein $R^{12a}$ and $R^{12b}$ are each independently chosen from:
a) —H;
b) —$OR^{13}$;
$R^{13}$ is hydrogen or $C_1$-$C_4$ linear alkyl;
c) $C_1$-$C_{12}$ substituted or unsubstituted linear, branched, or cyclic alkyl;
d) $C_6$ or $C_{10}$ substituted or unsubstituted aryl;
e) $C_1$-$C_9$ substituted or unsubstituted heterocyclic;
f) $C_1$-$C_{11}$ substituted or unsubstituted heteroaryl; and
g) $R^{12a}$ and $R^{12b}$ can be taken together to form a substituted or unsubstituted ring having from 3 to 10 carbon atoms and from 0 to 3 heteroatoms chosen from oxygen, nitrogen, and sulfur;
x) —$[C(R^{10a})(R^{10b})]_y C(O)R^{14}$;
wherein $R^{14}$ is chosen from:
a) $C_1$-$C_{12}$ substituted or unsubstituted linear, branched, or cyclic alkyl;
b) —$OR^{15}$;
wherein $R^{15}$ is hydrogen, substituted or unsubstituted $C_1$-$C_4$ linear alkyl, $C_6$ or $C_{10}$ substituted or unsubstituted aryl, $C_1$-$C_9$ substituted or unsubstituted heterocyclic, $C_1$-$C_{11}$ substituted or unsubstituted heteroaryl; and
c) $N(R^{16a})(R^{16b})$;
wherein $R^{16a}$ and $R^{16b}$ are each independently hydrogen, $C_1$-$C_{12}$ substituted or unsubstituted linear, branched, or cyclic alkyl; $C_6$ or $C_{10}$ substituted or unsubstituted aryl; $C_1$-$C_9$ substituted or unsubstituted heterocyclic; $C_1$-$C_{11}$ substituted or unsubstituted heteroaryl; or $R^{16a}$ and $R^{16b}$ can be taken together to form a substituted or unsubstituted ring having from 3 to 10 carbon atoms and from 0 to 3 heteroatoms chosen from oxygen, nitrogen, and sulfur;
xi) —$[C(R^{10a})(R^{10b})]_y OC(O)R^{17}$;
wherein $R^{17}$ is chosen from:
a) $C_1$-$C_{12}$ substituted or unsubstituted linear, branched, or cyclic alkyl; and)
b) —$N(R^{18a})(R^{18b})$;
$R^{18a}$ and $R^{18b}$ are each independently hydrogen, $C_1$-$C_{12}$ substituted or unsubstituted linear, branched, or cyclic alkyl; $C_6$ or $C_{10}$ substituted or unsubstituted aryl; $C_1$-$C_9$ substituted or unsubstituted heterocyclic; $C_1$-$C_{11}$ substituted or unsubstituted heteroaryl; or $R^{18a}$ and $R^{18b}$ can be taken together to form a substituted or unsubstituted ring having from 3 to 10 carbon atoms and from 0 to 3 heteroatoms chosen from oxygen, nitrogen, and sulfur;

xii) —[C(R$^{10a}$)(R$^{10b}$)]$_y$NR$^{19}$C(O)R$^{20}$;
  wherein R$^{18}$ is chosen from:
  a) —H; and
  b) C$_1$-C$_4$ substituted or unsubstituted linear, branched, or cyclic alkyl;
  wherein R$^{20}$ is chosen from:
  a) C$_1$-C$_{12}$ substituted or unsubstituted linear, branched, or cyclic alkyl; and
  b) —N(R$^{21a}$)(R$^{21b}$);
    R$^{21a}$ and R$^{21b}$ are each independently hydrogen, C$_1$-C$_{12}$ substituted or unsubstituted linear, branched, or cyclic alkyl; C$_6$ or C$_{10}$ substituted or unsubstituted aryl; C$_1$-C$_9$ substituted or unsubstituted heterocyclic; C$_1$-C$_{11}$ substituted or unsubstituted heteroaryl; or R$^{21a}$ and R$^{21b}$ can be taken together to form a substituted or unsubstituted ring having from 3 to 10 carbon atoms and from 0 to 3 heteroatoms chosen from oxygen, nitrogen, and sulfur;
xiii) —[C(R$^{10a}$)(R$^{10b}$)]$_y$CN;
xiv) —[C(R$^{10a}$)(R$^{10b}$)]$_y$NO$_2$;
xv) —[C(R$^{10a}$)(R$^{10b}$)]$_y$SO$_2$R$^{22}$;
  R$^{22}$ is hydrogen, hydroxyl, substituted or unsubstituted C$_1$-C$_4$ linear or branched alkyl; substituted or unsubstituted C$_6$, C$_{10}$, or C$_{14}$ aryl; C$_7$-C$_{15}$ alkylenearyl; C$_1$-C$_9$ substituted or unsubstituted heterocyclic; or C$_1$-C$_{11}$ substituted or unsubstituted heteroaryl; and
xvi) halogen;
xvii) —[C(R$^{10a}$)(R$^{10b}$)]$_y$(C H$_j$X$_k$)$_h$CH$_{j'}$X$_{k'}$; wherein X is halogen, the index j is an integer from 0 to 2, the index k is an integer from 1 to 3, j+k=3; the index j' is an integer from 0 to 2, the index k' is and integer from 0 to 2, j'+k'=2; the index h is from 0 to 5;
  R$^{10a}$ and R$^{10b}$ are each independently hydrogen or C$_1$-C$_4$ alkyl; and
  the index y is from 0 to 5;
  R$^1$ and R$^8$ can be taken together to from a 5 to 7 member ring containing from 3 to 7 carbon atoms and from 0 to 2 heteroatoms chosen from oxygen, sulfur, or nitrogen, wherein one or more of the carbon atoms can be substituted, unsubstituted, or a carbonyl unit.

As described herein above, the various units that comprise R$^1$ to R$^8$ can be substituted by one or more units independently chosen from:
i) C$_1$-C$_{12}$ linear, branched, or cyclic alkyl, alkenyl, and alkynyl;
ii) C$_1$-C$_{12}$ linear, branched, or cyclic alkoxy, alkenyloxy, and alkynyloxy;
iii) C$_1$-C$_{12}$ linear, branched, or cyclic haloalkyl, haloalkenyl, and haloalkynyl;
iv) C$_6$ or C$_{10}$ aryl;
v) C$_6$ or C$_{10}$ alkylenearyl;
vi) C$_1$-C$_9$ heterocyclic rings;
vii) C$_1$-C$_9$ heteroaryl rings;
viii) —(CR$^{102a}$R$^{102b}$)$_z$OR$^{101}$;
ix) —(CR$^{102a}$R$^{102b}$)$_z$C(O)R$^{101}$;
x) —(CR$^{102a}$R$^{102b}$)$_z$C(O)OR$^{101}$;
xi) —(CR$^{102a}$R$^{102b}$)$_z$C(O)N(R$^{101}$)$_2$;
xii) (CR$^{102a}$R$^{102b}$)$_z$N(R$^{101}$)$_2$;
xiii) halogen;
xiv) —(CR$^{102a}$R$^{102b}$)$_z$CN;
xv) —(CR$^{102a}$R$^{102}$)$_z$NO$_2$;
xvi) —CH$_j$X$_k$; wherein X is halogen, the index j is an integer from 0 to 2, j+k=3; for example,
xvii) —(CR$^{102a}$R$^{102b}$)$_z$SR$^{101}$;
xviii) —(CR$^{102a}$R$^{102b}$)$_z$SO$_2$R$^{101}$ and
xix) —(CR$^{102a}$R$^{102b}$)$_z$SO$_3$R$^{101}$;
  wherein each R$^{101}$ is independently hydrogen, substituted or unsubstituted C$_1$-C$_6$ linear, branched, or cyclic alkyl, phenyl, benzyl, heterocyclic, or heteroaryl; or two R$^{101}$ units can be taken together to form a ring comprising 3-7 atoms; R$^{102a}$ and R$^{102b}$ are each independently hydrogen or C$_1$-C$_4$ linear or branched alkyl; the index z is from 0 to 4.

One aspect of the present disclosure relates to compounds wherein R$^1$ and R$^8$ can be taken together to from a 5 to 7 member ring containing from 3 to 7 carbon atoms and from 0 to 2 heteroatoms chosen from oxygen, sulfur, or nitrogen, wherein one or more of the carbon atoms can be substituted, unsubstituted, or a carbonyl unit.

One embodiment of this aspect relates to compounds wherein R$^1$ and R$^8$ are taken together to form a 6-member ring, for example, compounds chosen from:

i) benzo[de]isochromen-1(3H)-one having the formula:

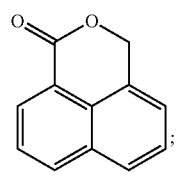 [SMILES: O=C1OCc2cccc3cccc1c23]

ii) 1H-benzo[de]isoquinoline-1,3(2H)-dione having the formula:

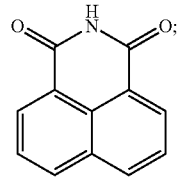 [SMILES: O=C1NC(=O)c2cccc3cccc1c23]

iii) 2,3-dihydro-1H-benzo[de]isoquinolin-1-one having the formula:

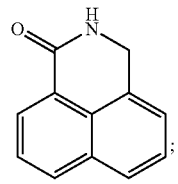 [SMILES: O=C1NCc2cccc3cccc1c23]

and iv) benzo[de]-isochromene-1,3-dione having the formula:

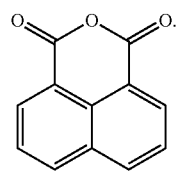 [SMILES: O=C1OC(=O)c2cccc3cccc1c23]

Another aspect of the present disclosure as it relates to compounds includes compounds having the formula:

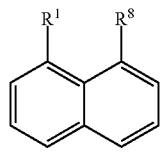

wherein $R^1$ and $R^8$ are each independently:
i) hydrogen; or
ii) —C(O)$R^{14}$;
wherein $R^{14}$ is —O$R^{15}$ or —N($R^{16a}$)($R^{16b}$); $R^{15}$ is hydrogen or methyl; $R^{16a}$ and $R^{16b}$ are each independently hydrogen or methyl. A non-limiting example of this aspect is naphthalene-1,8-dicarboxyamide having the formula:

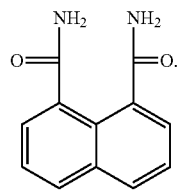 [SMILES: NC(=O)c1cccc2cccc(C(N)=O)c12]

For example, if a compound benzo[de]-isochromene-1,3-dione (1,8-Naphthalic Anhydride) is added to PET, the molecular size of benzo[de]-isochromene-1,3-dione (1,8-Naphthalic Anhydride) is just smaller than the free volume of PET at room temperature. A typical PET resin used in bottles has a molecular weight of ~28,000. Free volume of PET at room temperature is around 1301 (Angstrom)$^3$ (Reference: Polyakova, A, et. al., Journal of Polymer Science Part B: Polymer Physics, Vol 39, pages 1889-1899, year 2001). Molecular volume of benzo[de]-isochromene-1,3-dione (1,8-Naphthalic Anhydride) and 1H-benzo[de]isoquinoline-1,3(2H)-dione (1,8-Napthalimide) is 872 (Angstrom)$^3$ and 889 (Angstrom)$^3$ (Reference: Lieh Nguyen Shok and G. A. Gol'der, Translated from Zhurnal Strukturnoi Khimii, Vol. 11, No. 5, pp. 939-940, September-October 1970). As seen from the molecular volume numbers, it is clear that benzo[de]-isochromene-1,3-dione (1,8-Naphthalic Anhydride) and 1H-henzo[de]isoquinoline-1,3(2H)-dione (1,8-Napthalimide) molecules can fit inside the free volume of individual PET chains—and reduce the free volume of PET by as much as 68%. This reduction in free volume due to incorporation of additives described above increase the hop distance for $CO_2$ diffusion through PET, thereby reducing the $CO_2$ permeation rate and increasing shelf life of carbonated soft drink (CSD) and beer bottles.

Various methods exist for making the composition. In one aspect, the composition can be made by mixing the base polymer with the oxygen scavenger and the compound. In another aspect, the composition can be made by mixing the base polymer with the compound. In some aspects, the base polymer, the oxygen scavenger and the compound are mixed by tumbling in a hopper. Other optional ingredients can be added during this mixing process or added to the mixture after the aforementioned mixing or to an individual component prior to the aforementioned mixing step.

When melt processing is desired for the composition, the composition can also be made by adding each ingredient separately and mixing the ingredients just prior melt processing the composition to form an article. In some embodiments, the mixing can be just prior to the melt process zone. In other embodiments, one or more ingredients can be premixed in a separate step prior to bringing all of the ingredients together.

In some aspects, the compound can be added neat or in a carrier (such as a liquid or wax) to an extruder or other device for making the article, or the compound can be present in a concentrate or carrier with the oxygen scavenger, in a concentrate or carrier with the base polymer, or in a concentrate or carrier with a base polymer/oxygen scavenger blend. It is desirable that the addition of the compound does not substantially increase the intrinsic viscosity of the melt in the melt processing zone. Thus, compounds can be added in two or more stages, such as once during the melt phase for the production of the base polymer and again once more to the melting zone for making the article.

The melt blend of base polymer, oxygen scavenger, and compound can also be prepared by adding the components at the throat of an injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend. Such process steps work well for forming carbonated soft drink, water or beer bottles, packaging films and thermoformed trays. The present invention can be employed in any of the conventional known processes for producing a polymeric container, film, tray, or other article that would benefit from oxygen scavenging.

Articles

Various articles can be prepared from the disclosed compositions. Thus, the articles prepared from the compositions will also have the composition present in the article. Suitable articles include vessels and films, such as flexible sheet films, flexible bags, pouches, semi-rigid and rigid containers such as bottles (e.g. PET bottles) or combinations thereof. Typical flexible films and bags include those used to package various food items and can be made up of one or a multiplicity of layers to form the overall film or bag-like packaging material. The disclosed compositions can be used in one, some or all of the layers of such packaging material.

Specific articles include preforms, containers and films for packaging of food, beverages, cosmetics, pharmaceuticals, and personal care products where a high carbon dioxide or moisture or organoleptic barrier is needed. Examples of beverage containers are bottles for holding water and carbonated soft drinks, and the invention is particularly useful in bottle applications containing juices, sport drinks, beer or any other beverage where loss of carbon dioxide detrimentally affects the flavor, fragrance, performance (e.g., vitamin degradation). The compositions can also be useful as a sheet for thermoforming into rigid packages and films for flexible structures—to deliver organoleptic and moisture barrier. Rigid packages include food trays and lids. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket (if the part is made up of PET). As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method (as long as the liner is comprised of PET).

Besides articles applicable for packaging food and beverage, articles for packaging other carbon dioxide-sensitive products can also benefit from the present invention. Such products would include modified atmosphere packaging of fruits and vegetables, medical devices and the like.

In a further aspect, the composition can be used as a master batch for blending with a polymer or a polymer containing component. In such compositions, the concentration of the compound will be high enough to allow for the final blended product to have suitable amounts of these components. The master batch can also contain an amount of the base polymer with which the master batch is blended.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) co-extrusion and lamination using adhesive tie layers. Orientation, e.g., by stretch blow molding, of the polymer can be used with phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 6 minutes.

EXAMPLE 1

A 21.6 gram polyethylene terephthalate preform comprising compounds as disclosed herein was prepared on a 2-cavity Husky LX 160 injection molding machine under standard injection conditions. The following table (Table 1) compares the examples according to the present disclosure with samples comprising the disclosed compounds and a sample wherein caffeine substitutes for the disclosed compounds.

TABLE 1

| Run No. | PET[1,2] | Caffeine | benzo[de]-isochromene-1,3-dione | benzo[de]-isoquinoline-1,3-dione |
|---|---|---|---|---|
| 6821-1 | Parastar 7000 ™ | — | — | — |
| 6696-2 | Parastar 7000 ™ | 5% | — | — |

TABLE 1-continued

| Run No. | PET[1,2] | Caffeine | benzo[de]-isochromene-1,3-dione | benzo[de]-isoquinoline-1,3-dione |
|---|---|---|---|---|
| 6696-4 | Parastar 7000 ™ | — | 2.5% | — |
| 6696-3 | Parastar 7000 ™ | — | — | 2.5% |
| 6821-2 | Parastar 7000 ™ | 10% | — | — |
| 6821-4 | Parastar 7000 ™ | — | 5% | — |
| 6821-3 | Parastar 7000 ™ | — | — | 5% |

Parastar 7000 is a commercially available PET resin available from Eastman Chemical Co., Kingsport, Tennessee, USA.

The preforms were blown into a 12 oz. carbonated soft drink (CSD) container on Sidel's SBO 2/3 blow molding machine. The 12 oz. CSD bottles were then tested for $CO_2$ retention using Quantiperm.Model 504 (manufactured by Quantiperm, LLC). This instrument allows direct, real-time measurement of $CO_2$ loss from plastic bottles. Prior to testing the bottles are filled with carbonated water till 4.2 gas volumes of $CO_2$ for approximately one week in the preconditioning phase. After preconditioning phase is complete, the $CO_2$ efflux through the bottle wall is at a substantially constant rate. The Quantiperm instrument measures this steady state loss rate rapidly and directly. The real time loss rates are combined with the driving force ($CO_2$ partial pressure within the packages) to make accurate shelf life estimation for carbonated packages. A barrier improvement factor (BIF) can be determined by taking a ratio of the time taken for 20% $CO_2$ loss for the control package and the test package.

FIGS. 1, 2(a), and 2(b) show $CO_2$ loss as a function of time for variables 6821-1, 6821-2, 6821-3 and 6821-4, as measured by Quantiperm Model 504. Addition of 5% benzo [de]isochromene-1,3-dione and 5% benzo[de]isoquinoline-1,3-dione to PET reduces the rate of $CO_2$ loss, with a BIF of ~1.67× over PET. Variable 6821-2 did not offer as much improvement (BIF=1.1×) as Variables 6821-3 and 6821-4. As seen from FIG. 3, 6696-2 did not offer a substantial BIF over PET, but 6696-3 and 6696-4 showed improved performance, with a BIF of ~1.2×.

EXAMPLE 2

A 35.5 gram PET preform for a 16 oz. stock beer bottle comprising compounds as disclosed herein was prepared on a 2-cavity Husky LX 160 injection molding machine under standard injection conditions. The following table (Table 2) compares the examples according to the present disclosure with samples comprising the disclosed compounds.

TABLE 2

| Run # | PET used | Additive used | Wt % of additive |
|---|---|---|---|
| 8139-1 (Control) | Parastar 7000 | None | |
| 8139-2 | Parastar 7000 | ColorMatrix Process Aid 80-561-1 | 1% |
| 8139-3 | Parastar 7000 | ColorMatrix Process Aid 80-561-1 | 0.6% |
| 8139-4 | Parastar 7000 | Croda's Atmer 7150 | 5% |
| 8139-5 | Parastar 7000 | Techmer 13350 | 5% |
| 8139-6 | Parastar 7000 | 1,8-Naphthalic Anhydride (benzo[de]-isochromene-1,3-dione) | 5% |
| 8139-7 | Parastar 7000 | 1,8-Naphthalic Anhydride ColorMatrix Process Aid 80-561-1 | 4% 0.4% |

The preforms were blown into 16 oz. beer bottles on Sidel's SBO 2/3 blow molding machine. The preform heating zone profile for SBO 2/3 are shown in Table 3 below.

TABLE 3

| Zone | % Power from 2000 W lamp | Bulb distance from preform support ledge (mm) | Oven 1 ON/OFF | Oven 2 ON/OFF | Oven 3 ON/OFF |
|---|---|---|---|---|---|
| 1 | 98% | 7.5 | ON | ON | ON |
| 2 | 88% | 22.5 | ON | ON | ON |
| 3 | 46% | 37.5 | OFF | ON | OFF |
| 4 | 40% | 52.5 | ON | ON | OFF |
| 5 | 45% | 67.5 | OFF | ON | ON |
| 6 | 45% | 82.5 | OFF | OFF | ON |
| 7 | 51% | 97.5 | ON | ON | ON |

The preforms were blown on a cold mold (at 55 F) by using a 12 mm diameter stretch rod, 40 bar air pressure and at a machine speed of ~1500 bottles/hour. The preform heat setting (shown in Table 3) resulted in INT of 103 F as measured by infrared thermometer aimed at zone 3 of the preform coming out of the heating zone.

The 16 oz. beer bottles were then tested for $CO_2$ retention, $O_2$ Transmission Rate (OTR) and WVTR (water vapor transmission rate) to determine the effect of various additives on gas permeation.

Figure 4:
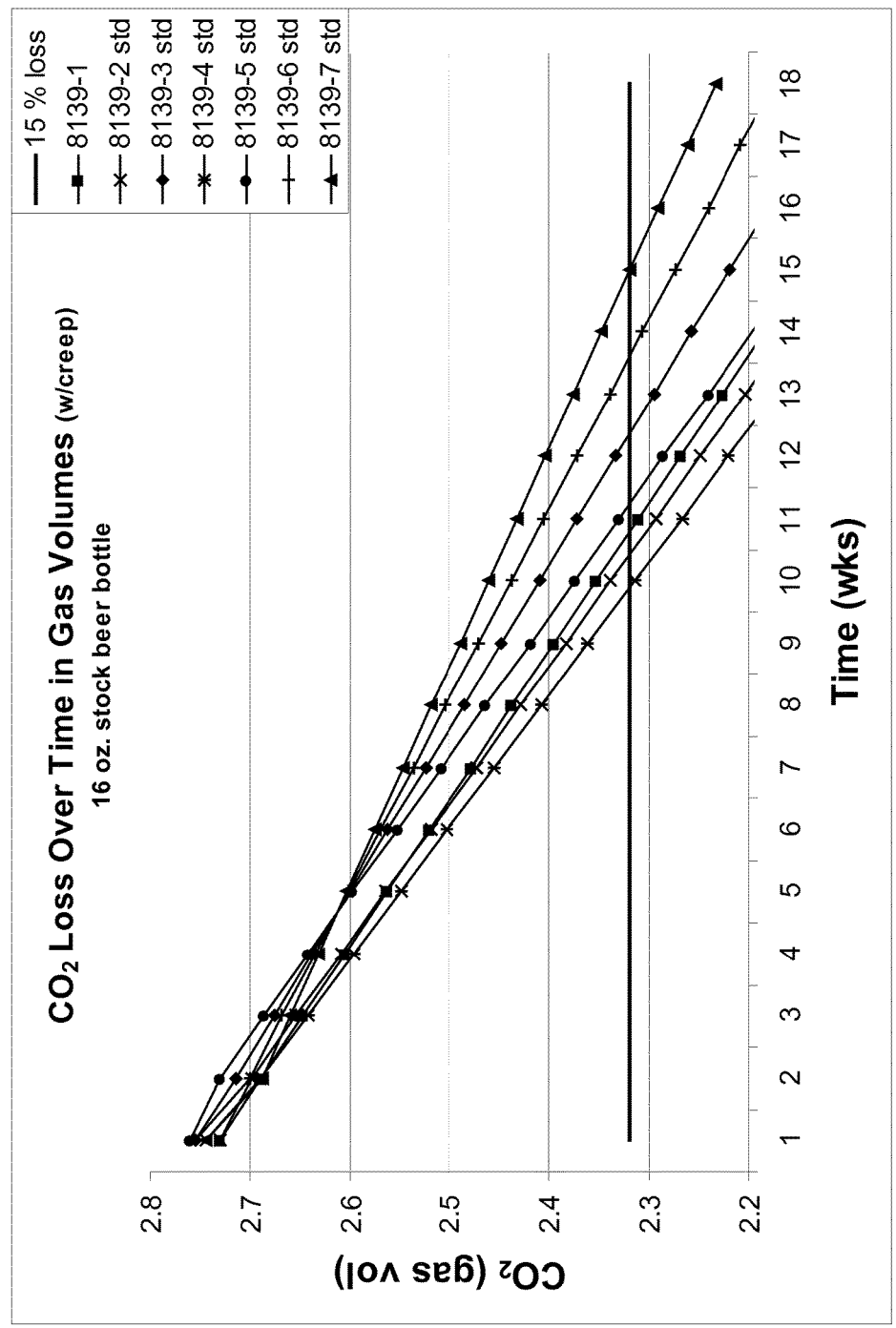
FIG. 4 shows representative $CO_2$ loss data for the disclosed polymer compositions as described below in Example 2.
Figure 5:
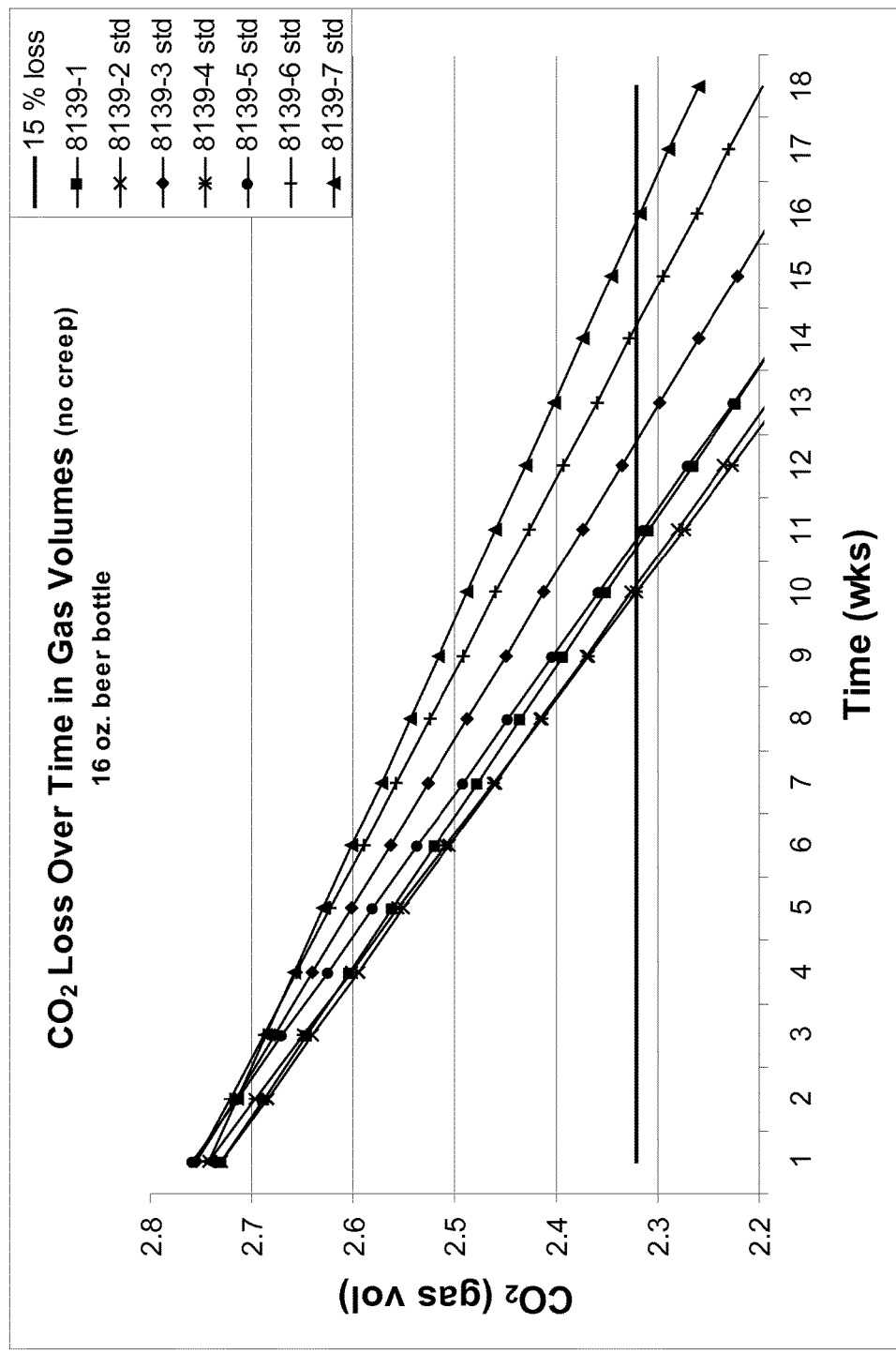
FIG. 5 shows representative $CO_2$ loss data for the disclosed polymer compositions as described below in Example 2.

A brief description of the apparatus (Quantiperm Model 504) used to measure $CO_2$ transmission rate is shown in Example 1. FIGS. 4 and 5 show $CO_2$ loss as a function of time for variables 8139-1, 8139-2, 8139-3, 8139-4, 8139-5, 8139-6 and 8139-7, as measured by Quantiperm Model 504. For beer bottles, shelf life is determined by measuring the time required for 15% $CO_2$ loss from initial carbonation levels. The shelf life and $CO_2$ BIF for different variables is shown in Table 4 below:

TABLE 4

| Example 2, Run # | Shelf life (weeks) Measured by Quantiperm | $CO_2$ BIF | OTR cc/pkg/day (measured by Iliop) | $O_2$ BIF |
|---|---|---|---|---|
| 8139-1 (CONTROL) | 9 | 1X | 0.0309 | 1X |
| 8139-2 | 9 | 1X | 0.0285 | 1.08X |
| 8139-3 | 11 | 1.22X | 0.0284 | 1.09X |
| 8139-4 | 9 | 1X | 0.0307 | 1X |
| 8139-5 | 10 | 1.11 | 0.0296 | 1.04X |
| 8139-6 | 13 | 1.44X | 0.0199 | 1.55X |
| 8139-7 | 14 | 1.56X | 0.0208 | 1.49X |

Addition of 4% benzo[de]isochromene-1,3-dione and 0.4% Fatty Acid Ester such as ColorMatrix Process Aid 80-561-1 to PET (Run 8139-7) reduces the rate of $CO_2$ loss, with a BIF of ~1.56× over PET. Variable 8139-2 and 8139-4 did not offer any improvement in $CO_2$ barrier—indicating the use of fatty acid esters by themselves have negligible effect on reducing the $CO_2$ permeation through PET bottle. Addition of 5% benzo[de]-isochromene-1,3-dione (1,8-Naphthalic Anhydride) to PET (Run 8139-6) did increase the shelf life by 1.44× over Control PET beer bottle. This result is similar to the result described in Example 1.

In addition to $CO_2$ permeation rate measurements, the bottles of Example 2 were tested for $O_2$ transmission rates (OTR) using Illiop. The OTR data show that addition of benzo[de]-isochromene-1,3-dione (1,8-Naphthalic Anhydride) to PET (in Run 8139-6 and 8139-7) resulted in reduction in OTR along with a reduction of CO2 TR (as seen from an increase in shelf life).

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:
1. A polymer composition, comprising:
   a) a base polymer comprising a polyester or polypropylene; and
   b) from about 0.1% to about 10% by weight of a compound having the formula:

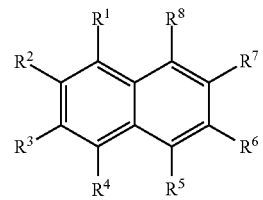

wherein $R^1$ and $R^8$ are each independently chosen from:
   ii) $C_7$-$C_{12}$ linear, branched, or cyclic alkyl;
   iii) $C_2$-$C_{12}$ linear, branched, or cyclic alkenyl;
   iv) $C_2$-$C_{12}$ linear or branched alkynyl;
   v) $C_6$ or $C_{10}$ aryl;
   viii) —[C($R^{10a}$)($R^{10b}$)]$_y$O$R^{11}$;
      wherein $R^{11}$ is chosen from:
         a) —H;
         b) $C_1$-$C_{12}$ linear, branched, or cyclic alkyl or $C_1$-$C_{12}$ linear, branched, or cyclic haloalkyl; and
         c) $C_6$ or $C_{10}$ aryl or $C_7$-$C_{20}$ alkylenearyl;
   ix) —[C($R^{10a}$)($R^{10b}$)]$_y$N($R^{12a}$)($R^{12b}$);
      wherein $R^{12a}$ and $R^{12b}$ are each independently chosen from:
         a) —H;
         b) —O$R^{13}$;
            $R^{13}$ is hydrogen or $C_1$-$C_4$ linear alkyl;
         c) $C_1$-$C_{12}$ linear, branched, or cyclic alkyl; and
         d) $C_6$ or $C_{10}$ aryl; and
      wherein when y is 0 $R^{12a}$ and $R^{12b}$ are not both a $C_1$-$C_{12}$ linear, branched, or cyclic alkyl;
   x) —[C($R^{10a}$)($R^{10b}$)]$_y$C(O)$R^{14}$;
      wherein $R^{14}$ is chosen from:
         a) $C_1$-$C_{12}$ linear, branched, or cyclic alkyl;
         b) —O$R^{15}$;
            wherein $R^{15}$ is hydrogen, $C_1$-$C_4$ linear alkyl, or $C_6$ or $C_{10}$ aryl; and
         c) —N($R^{16a}$)($R^{16b}$);
            wherein $R^{16a}$ and $R^{16b}$ are each independently hydrogen, $C_1$-$C_{12}$ linear, branched, or cyclic alkyl; or $C_6$ or $C_{10}$ aryl;
   xi) —[C($R^{10a}$)($R^{10b}$)]$_y$OC(O)$R^{17}$;
      wherein $R^{17}$ is chosen from:
         a) $C_1$-$C_{12}$ linear, branched, or cyclic alkyl; and
         b) —N($R^{18a}$)($R^{18b}$);
            $R^{18a}$ and $R^{18b}$ are each independently hydrogen, $C_1$-$C_{12}$ linear, branched, or cyclic alkyl; or $C_6$ or $C_{10}$ aryl;

xii) —[C(R^{10a})(R^{10b})]_y NR^{19}C(O)R^{20};
   wherein R^{19} is chosen from:
   a) —H; and
   b) $C_1$-$C_4$ linear, branched, or cyclic alkyl;
   wherein R^{20} is chosen from:
   a) $C_1$-$C_{12}$ linear, branched, or cyclic alkyl; and
   b) —N(R^{21a})(R^{21b});
      R^{21a} and R^{21b} are each independently hydrogen, $C_1$-$C_{12}$ linear, branched, or cyclic alkyl; or $C_6$ or $C_{10}$ aryl;
xiii) —[C(R^{10a})(R^{10b})]_y CN;
xiv) —[C(R^{10a})(R^{10b})]_y NO_2;
xv) —[C(R^{10a})(R^{10b})]_y SO_2 R^{22};
   R^{22} is hydrogen, hydroxyl, $C_1$-$C_4$ linear or branched alkyl; $C_6$, $C_{10}$, or $C_{14}$ aryl; or $C_7$-$C_{15}$ alkylenearyl;
xvi) halogen; and
xvii) —[C(R^{10a})(R^{10b})]_y(CH_jX_k)_hCH_{j'}X_{k'}; wherein X is halogen, the index j is an integer from 0 to 2, the index k is an integer from 1 to 3, j+k=3; the index j' is an integer from 0 to 2, the index k' is and integer from 0 to 2, j'+k'=2; the index h is from 0 to 5; or
xviii) R^1 and R^8 together form a 6 membered ring containing from 4 to 6 carbon atoms and from 0 to 2 heteroatoms chosen from oxygen, sulfur, or nitrogen, wherein one or more of the carbon atoms can form a carbonyl unit; and
R^{10a} and R^{10b} are each independently hydrogen or $C_1$-$C_4$ alkyl; and
the index y is from 0 to 5; and
wherein R^2 to R^7 are each hydrogen.

2. The composition according to claim 1, wherein R^1 and R^8 are each independently chosen from:
i) $C_7$-$C_{12}$ linear, branched, or cyclic alkyl, alkenyl, and alkynyl;
ii) $C_1$-$C_{12}$ linear, branched, or cyclic alkoxy;
iii) $C_1$-$C_{12}$ linear, haloalkyl;
iv) $C_6$ or $C_{10}$ aryl;
v) $C_7$-$C_{20}$ alkylenearyl;
viii) —(CR^{102a}R^{102b})_z OR^{101};
ix) —(CR^{102a}R^{102b})_z C(O)R^{101};
x) —(CR^{102a}R^{102b})_z C(O)OR^{101};
xi) —(CR^{102a}R^{102b})_z C(O)N(R^{101})_2;
xii) —(CR^{102a}R^{102b})_z N(R^{101})_2, wherein when z is 0 then R^{101} is not $C_1$-$C_6$ linear, branched, or cyclic alkyl;
xiii) halogen;
xiv) —(CR^{102a}R^{102b})_z CN;
xv) —(CR^{102a}R^{102b})_z NO_2;
xvi) —CH_jX_k; wherein X is halogen, the index j is an integer from 0 to 2, j+k=3;
xvii) —(CR^{102a}R^{102b})_z SR^{101};
xviii) —(CR^{102a}R^{102b})_z SO_2 R^{101} and
xix) —(CR^{102a}R^{102b})_z SO_3 R^{101};
wherein each R^{101} is independently hydrogen, $C_1$-$C_6$ linear, branched, or cyclic alkyl, phenyl, or benzyl; R^{102a} and R^{102b} are each independently hydrogen or $C_1$-$C_4$ linear or branched alkyl; the index z is from 0 to 4.

3. The composition according to claim 1, wherein R^1 and R^8 together form a 6 membered ring containing from 4 to 5 carbon atoms and 1 or 2 heteroatoms chosen from oxygen, sulfur, or nitrogen, wherein one or more of the carbon atoms forms a carbonyl unit.

4. The composition according to claim 1, wherein the compound is chosen from:
i) benzo[de]isochromen-1(3H)-one having the formula:

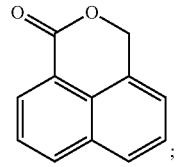 [SMILES: O=C1OCc2cccc3cccc1c23]

ii) 1H-benzo[de]isoquinoline-1,3(2H)-dione having the formula:

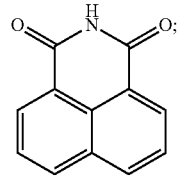 [SMILES: O=C1NC(=O)c2cccc3cccc1c23]

and
iii) 2,3-dihydro-1H-benzo[de]isoquinolin-1-one having the formula:

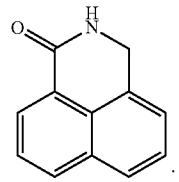 [SMILES: O=C1NCc2cccc3cccc1c23]

5. The composition according to claim 1, further comprising from about 0.1% to about 10% by weight of an oxygen scavenger; wherein the oxygen scavenger is an N-allylic amine or N-benzylic amide.

6. The composition according to claim 1, wherein the base polymer comprises a polyester.

7. The composition according to claim 6, wherein the polyester base polymer comprises polyethylene terephthalate or a copolymer thereof.

8. The polymer composition of claim 1, wherein the base polymer comprises polypropylene.

9. A preform comprising the composition according to any one of claims 1, 2, 3, 4 and 5-8.

10. An article of manufacture comprising the composition according to any one of claims 1, 2, 3, 4 and 5-8.

11. The article according to claim 10, wherein the article is a monolayered article.

12. An article of manufacture, comprising:
a) a base polymer comprising a polyester or polypropylene;
b) from about 0.1% to about 10% by weight of a compound having the formula:

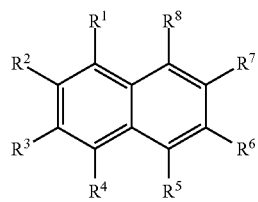

wherein $R^1$ and $R^8$ are each independently chosen from:
ii) $C_7$-$C_{12}$ linear, branched, or cyclic alkyl;
iii) $C_2$-$C_{12}$ linear, branched, or cyclic alkenyl;
iv) $C_2$-$C_{12}$ linear or branched alkynyl;
v) $C_6$ or $C_{10}$ aryl;
viii) —$[C(R^{10a})(R^{10b})]_y OR^{11}$;
  wherein $R^{11}$ is chosen from:
   a) —H;
   b) $C_1$-$C_{12}$ linear, branched, or cyclic alkyl or $C_1$-$C_{12}$ linear, branched, or cyclic haloalkyl; and
   c) $C_6$ or $C_{10}$ aryl or $C_7$-$C_{20}$ alkylenearyl;
ix) —$[C(R^{10a})(R^{10b})]_y N(R^{12a})(R^{12b})$;
  wherein $R^{12a}$ and $R^{12b}$ are each independently chosen from:
   a) —H;
   b) —$OR^{13}$;
     $R^{13}$ is hydrogen or $C_1$-$C_4$ linear alkyl;
   c) $C_1$-$C_{12}$ linear, branched, or cyclic alkyl; and
   d) $C_6$ or $C_{10}$ aryl; and
  wherein when y is 0, then $R^{12a}$ and $R^{12b}$ are not both a $C_1$-$C_{12}$ linear, branched, or cyclic alkyl;
x) —$[C(R^{10a})(R^{10b})]_y C(O)R^{14}$;
  wherein $R^{14}$ is chosen from:
   a) $C_1$-$C_{12}$ linear, branched, or cyclic alkyl;
   b) —$OR^{15}$;
     wherein $R^{15}$ is hydrogen, $C_1$-$C_4$ linear alkyl, or $C_6$ or $C_{10}$ aryl; and
   c) —$N(R^{16a})(R^{16b})$;
     wherein $R^{16a}$ and $R^{16b}$ are each independently hydrogen, $C_1$-$C_{12}$ linear, branched, or cyclic alkyl; or $C_6$ or $C_{10}$ aryl;
xi) —$[C(R^{10a})(R^{10b})]_y OC(O)R^{17}$;
  wherein $R^{17}$ is chosen from:
   a) $C_1$-$C_{12}$ linear, branched, or cyclic alkyl; and
   b) —$N(R^{18a})(R^{18b})$;
     $R^{18a}$ and $R^{18b}$ are each independently hydrogen, $C_1$-$C_{12}$ linear, branched, or cyclic alkyl; or $C_6$ or $C_{10}$ aryl;
xii) —$[C(R^{10a})(R^{10b})]_y NR^{19}C(O)R^{20}$;
  wherein $R^{19}$ is chosen from:
   a) —H; and
   b) $C_1$-$C_4$ linear, branched, or cyclic alkyl;
  wherein $R^{20}$ is chosen from:
   a) $C_1$-$C_{12}$ linear, branched, or cyclic alkyl; and
   b) —$N(R^{21a})(R^{21b})$;
     $R^{21a}$ and $R^{21b}$ are each independently hydrogen, $C_1$-$C_{12}$ linear, branched, or cyclic alkyl; or $C_6$ or $C_{10}$ aryl;
xiii) —$[C(R^{10a})(R^{10b})]_y CN$;
xiv) —$[C(R^{10a})(R^{10b})]_y NO_2$;
xv) —$[C(R^{10a})(R^{10b})]_y SO_2 R^{22}$;
  $R^{22}$ is hydrogen, hydroxyl, $C_1$-$C_4$ linear or branched alkyl; $C_6$, $C_{10}$, or $C_{14}$ aryl; or $C_7$-$C_{15}$ alkylenearyl; and
xvi) halogen; and
xvii) —$[C(R^{10a})(R^{10b})]_y (CH_j X_k)_h CH_{j'} X_{k'}$; wherein X is halogen, the index j is an integer from 0 to 2, the index k is an integer from 1 to 3, j+k=3; the index j' is an integer from 0 to 2, the index k' is and integer from 0 to 2, j'+k'=2; the index h is from 0 to 5; or
xviii) $R^1$ and $R^8$ together form a 6 membered ring containing from 4 to 6 carbon atoms and from 0 to 2 heteroatoms chosen from oxygen, sulfur, or nitrogen, wherein one or more of the carbon atoms can form a carbonyl unit; and
$R^{10a}$ and $R^{10b}$ are each independently hydrogen or $C_1$-$C_4$ alkyl; and the index y is from 0 to 5; and
wherein $R^2$ to $R^7$ are each hydrogen.

13. The article according to claim 12, wherein $R^1$ and $R^8$ are each independently chosen from:
 i) $C_7$-$C_{12}$ linear, branched, or cyclic alkyl, alkenyl, and alkynyl;
 ii) $C_1$-$C_{12}$ linear, branched, or cyclic alkoxy;
 iii) $C_1$-$C_{12}$ linear haloalkyl;
 iv) $C_6$ or C10 aryl;
 v) $C_7$-$C_{20}$ alkylenearyl;
 viii) —$(CR^{102a}R^{102b})_z OR^{101}$;
 ix) —$(CR^{102a}R^{102b})_z C(O)R^{101}$;
 x) —$(CR^{102a}R^{102b})_z C(O)OR^{101}$;
 xi) —$(CR^{102a}R^{102b})C(O)N(R^{101})_2$;
 xii) —$(CR^{102a}R^{102b})_z N(R^{101})_2$, wherein when z is 0 then $R^{101}$ is not $C_1$-$C_6$ linear, branched, or cyclic alkyl;
 xiii) halogen;
 xiv) —$(CR^{102a}R^{102b})_z CN$;
 xv) —$(CR^{102a}R^{102b})_z NO_2$;
 xvi) —$CH_j X_k$; wherein X is halogen, the index j is an integer from 0 to 2, j+k=3;
 xvii) —$(CR^{102a}R^{102b})_z SR^{101}$;
 xviii) —$(CR^{102a}R^{102b})_z SO_2 R^{101}$ and
 xix) —$(CR^{102a}R^{102b})_z SO_3 R^{101}$;
 wherein each $R^{101}$ is independently hydrogen, $C_1$-$C_6$ linear, branched, or cyclic alkyl, phenyl, or benzyls; $R^{102a}$ and $R^{102b}$ are each independently hydrogen or $C_1$-$C_4$ linear or branched alkyl; the index z is from 0 to 4.

14. The article according to claim 12, wherein $R^1$ and $R^8$ together form a membered ring containing from 4 to 5 carbon atoms and 1 or 2 heteroatoms chosen from oxygen, sulfur, or nitrogen, wherein one or more of the carbon atoms forms a carbonyl unit.

15. The article according to claim 12, wherein the compound is chosen from:
 i) benzo[de]isochromen-1(3H)-one having the formula:

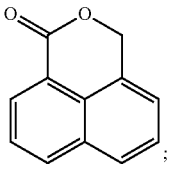 [SMILES: O=C1OCc2cccc3cccc1c23]

ii) 1H-benzo[de]isoquinoline-1,3(2H)-dione having the formula:

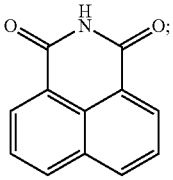

and
iii) 2,3-dihydro-1H-benzo[de]isoquinolin-1-one having the formula:

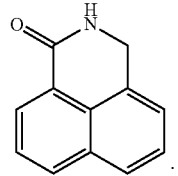

16. The article according to claim 12, further comprising from about 0.1% to about 10% by weight of an oxygen scavenger; wherein the oxygen scavenger is an N-allylic amide or N-benzylic amide.

17. The article according to claim 12, wherein the base polymer comprises a polyester.

18. The article according to claim 17, wherein the polyester base polymer comprises polyethylene terephthalate or a copolymer thereof.

* * * * *